Figure 1:
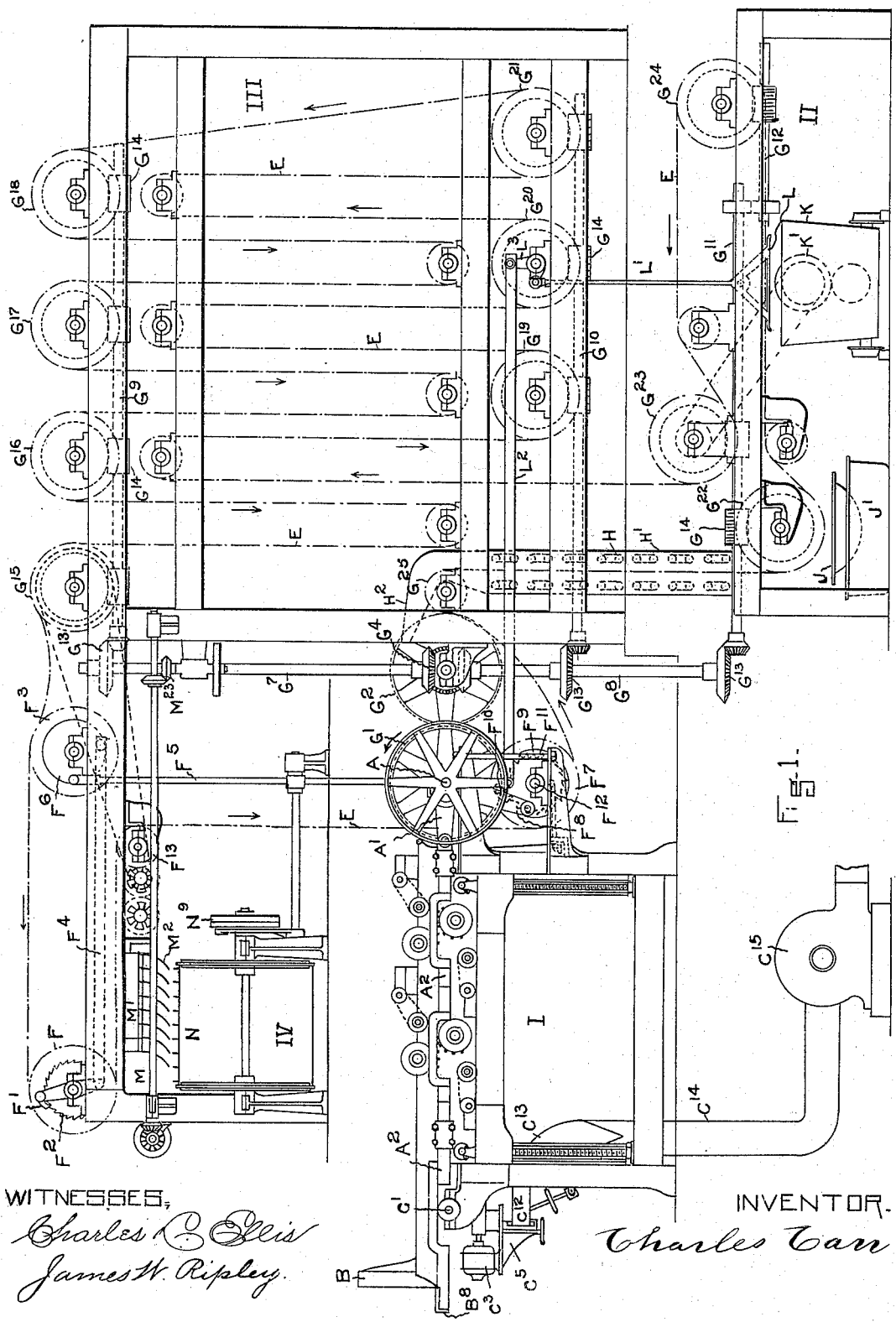

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 1.

WITNESSES,
Charles C. Ellis
James W. Ripley

INVENTOR.
Charles Carr

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 2.
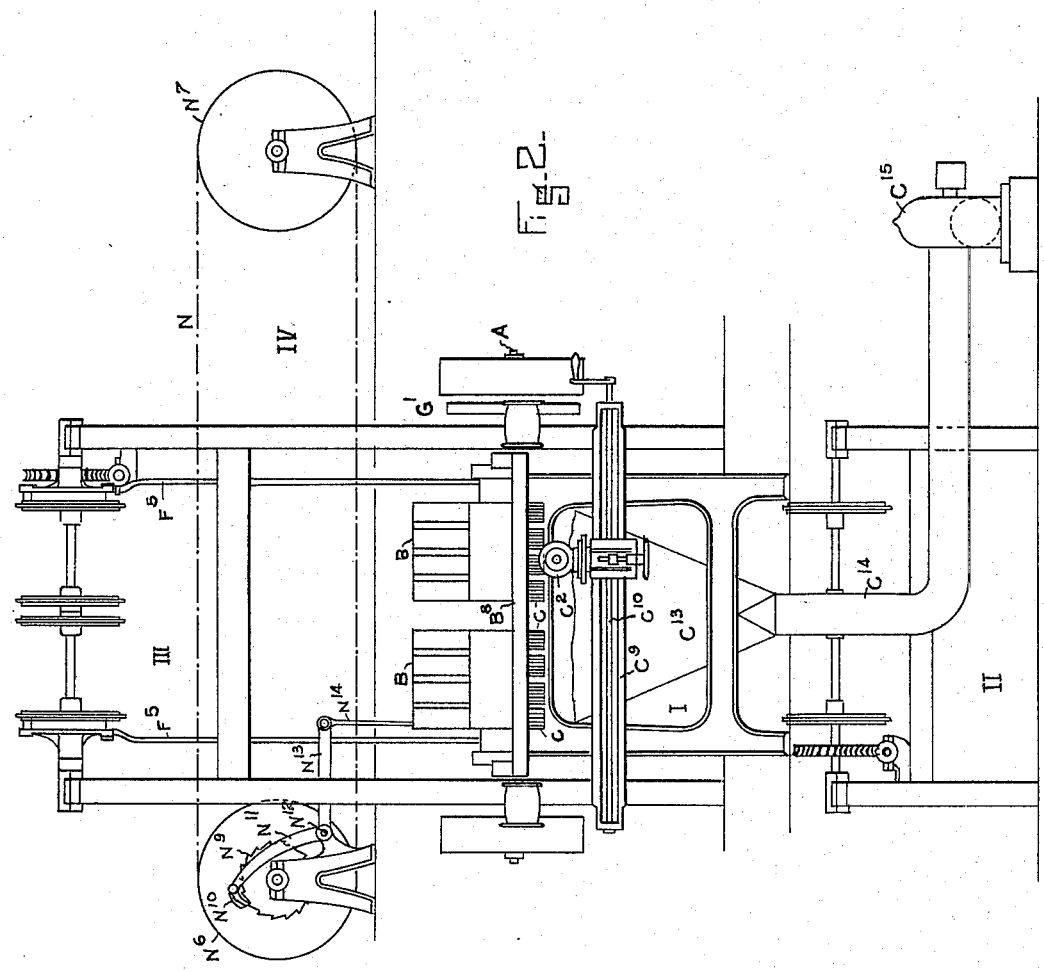
WITNESSES,
INVENTOR:

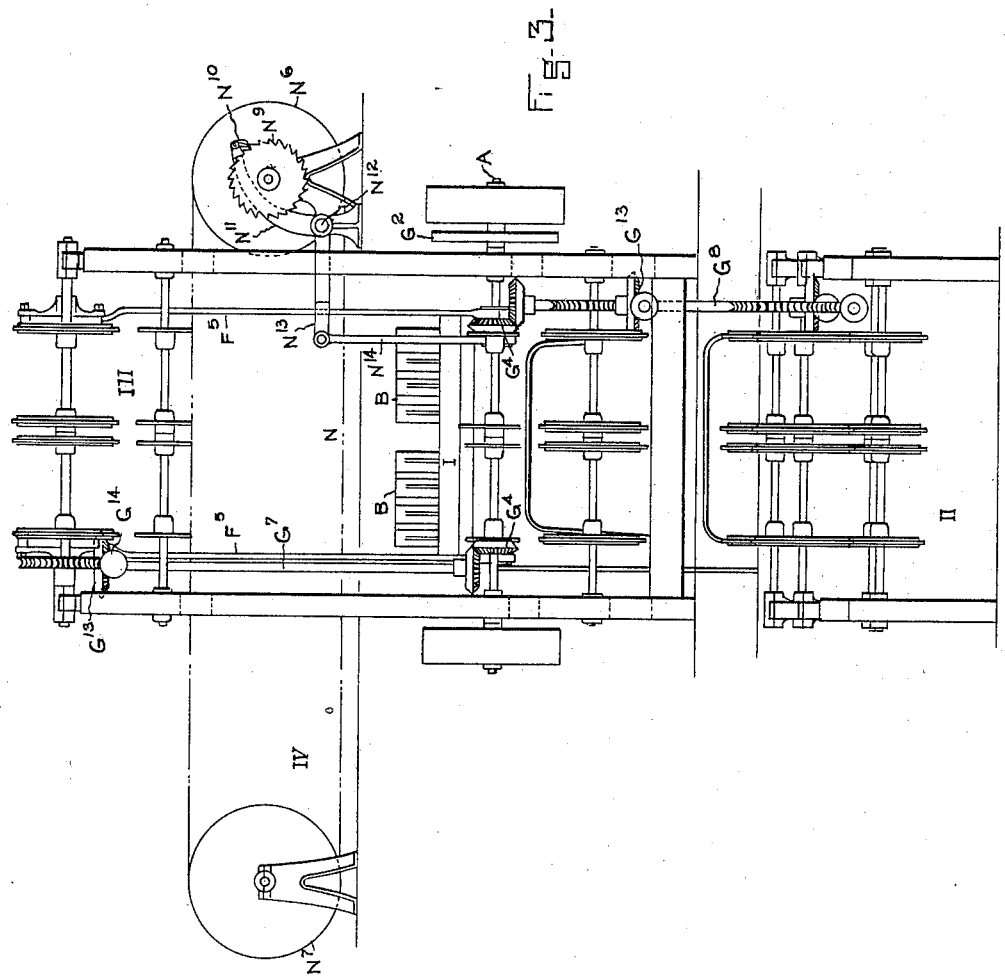

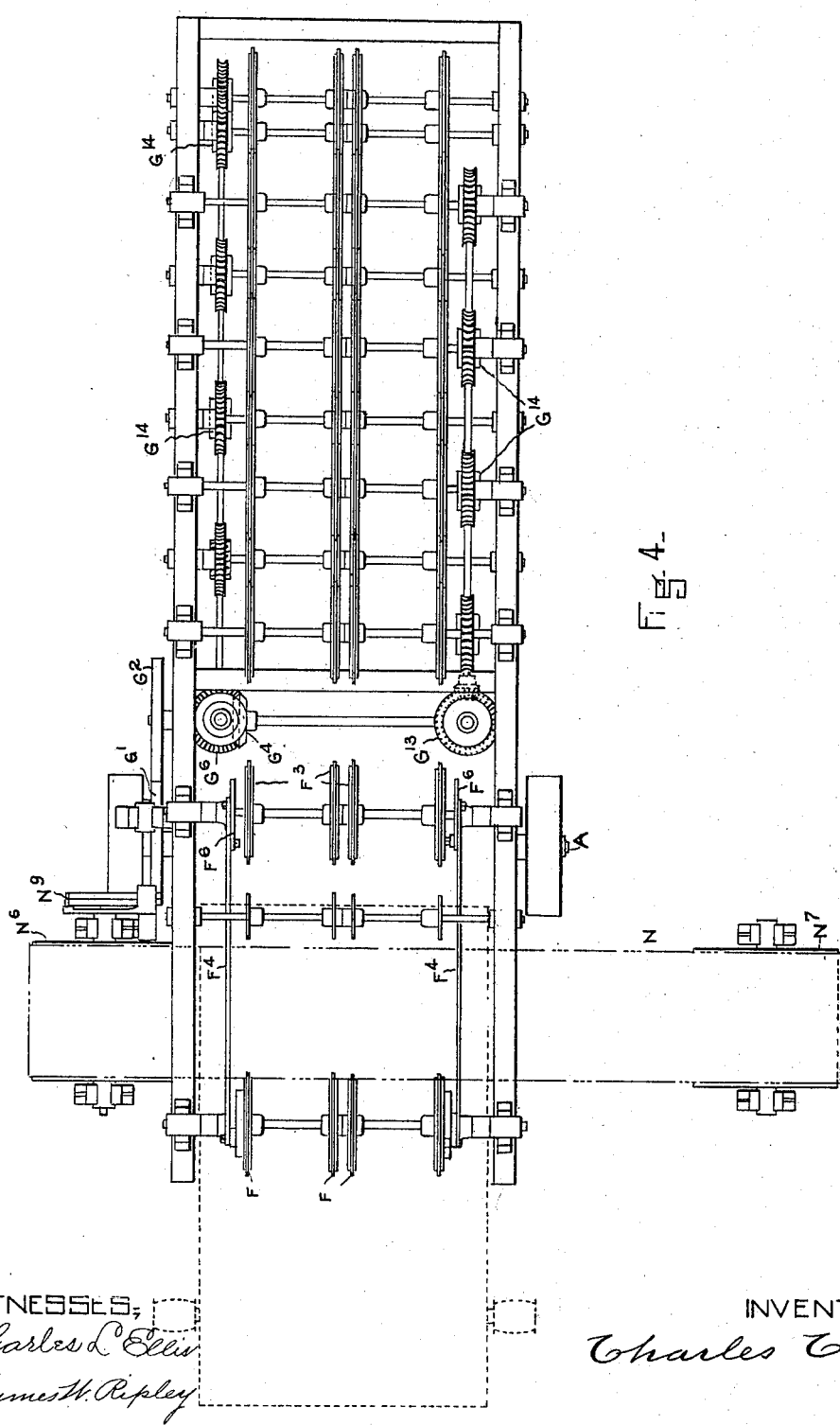

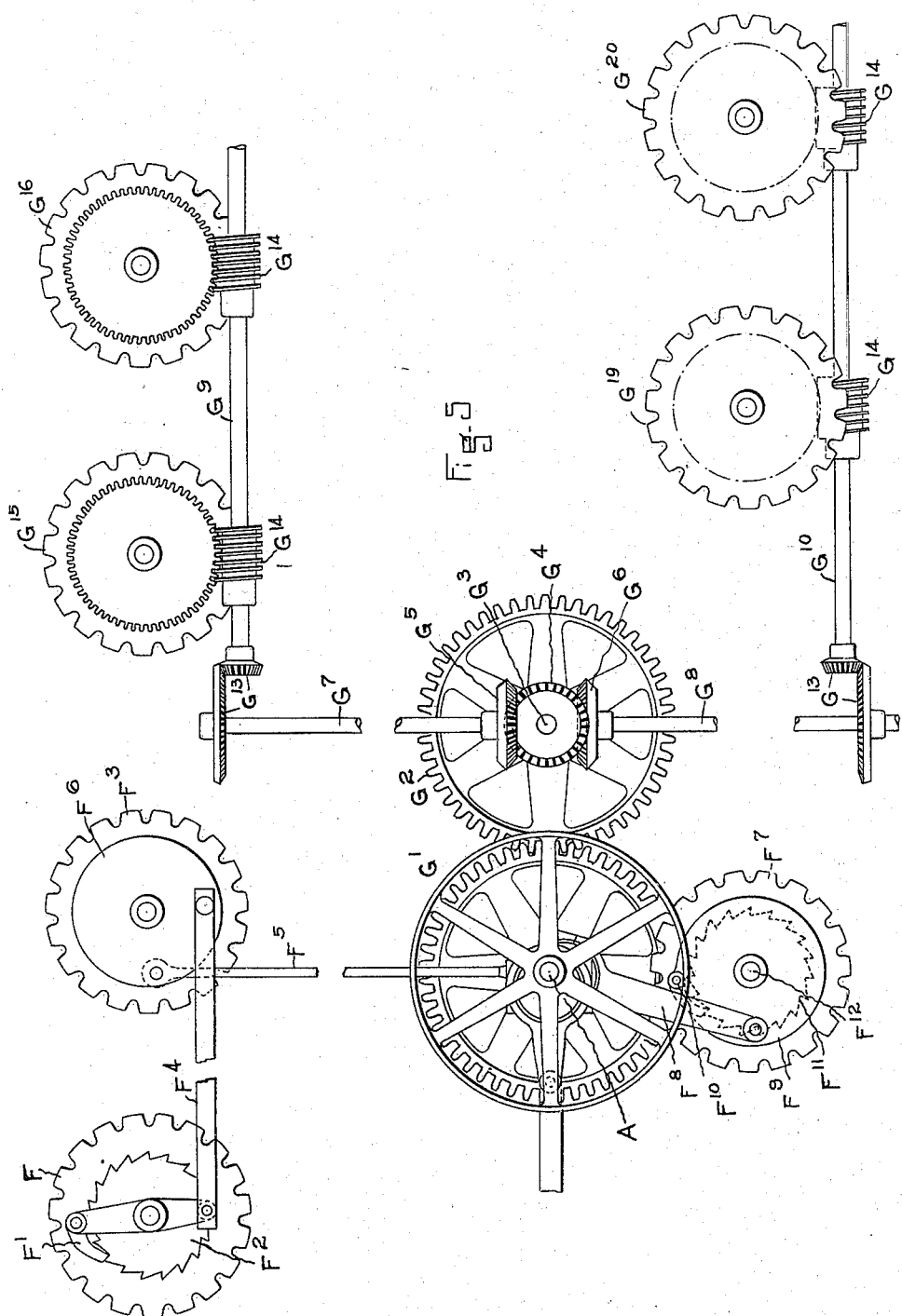

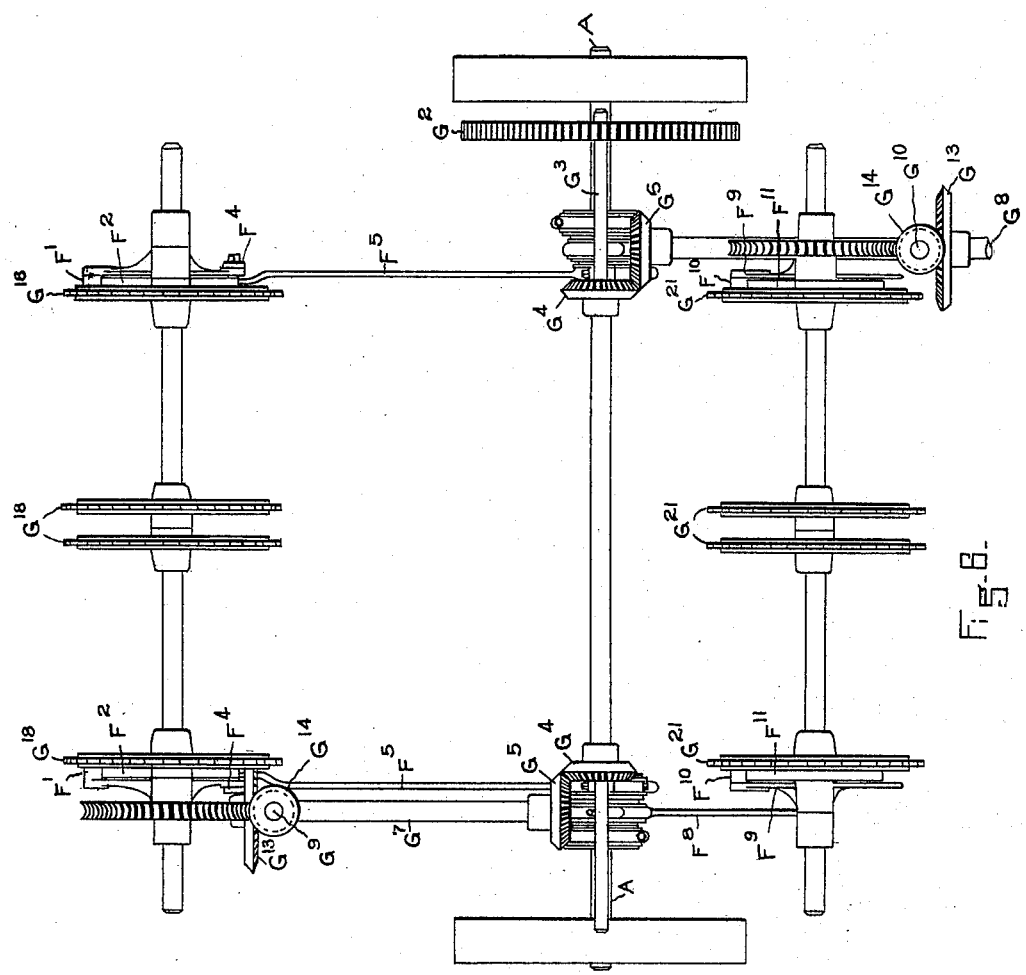

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 7.
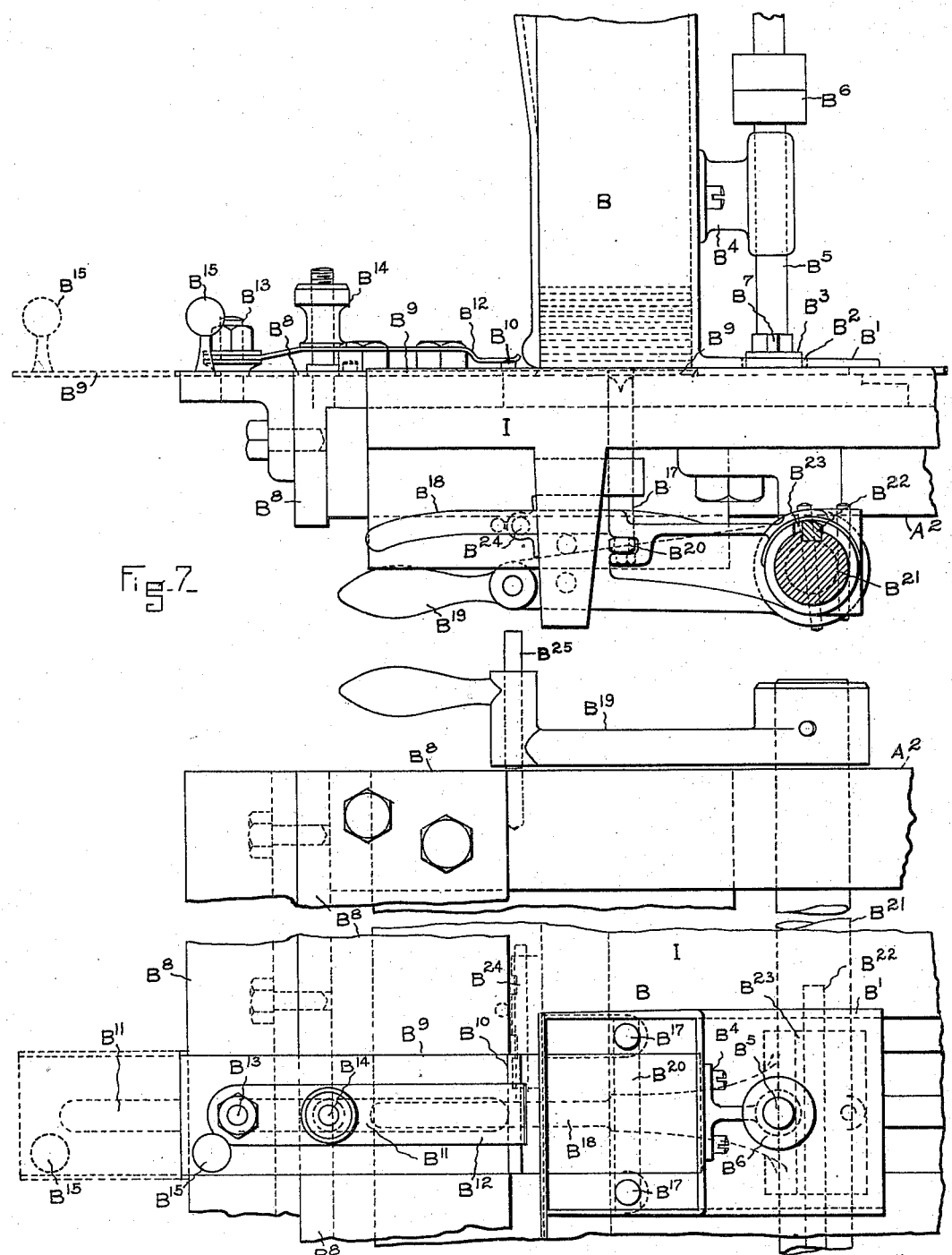
WITNESSES:
Charles R Ellis.
James W. Ripley
INVENTOR:
Charles Carr No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 8.

WITNESSES:
Charles C. Ellis.
James W. Ripley

INVENTOR:
Charles Carr

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 9.
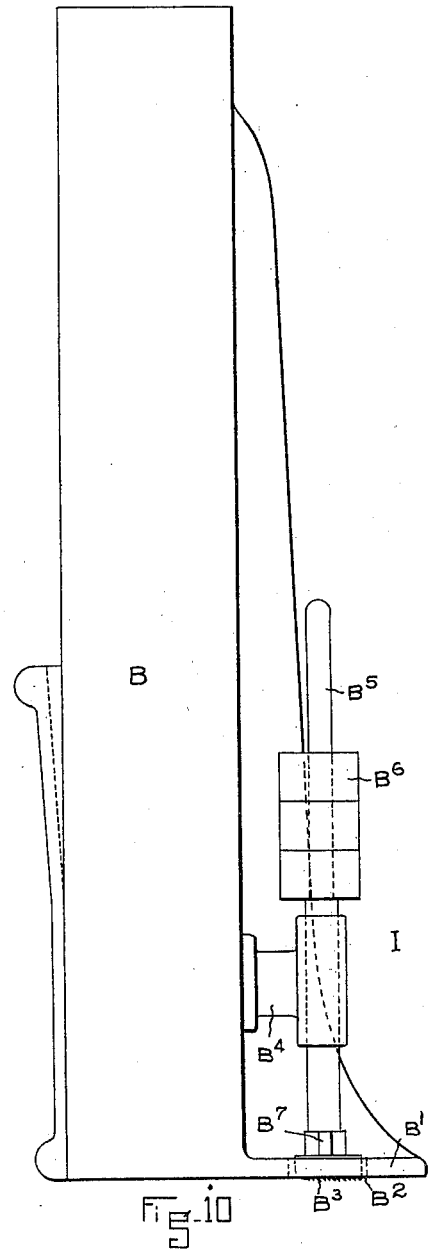
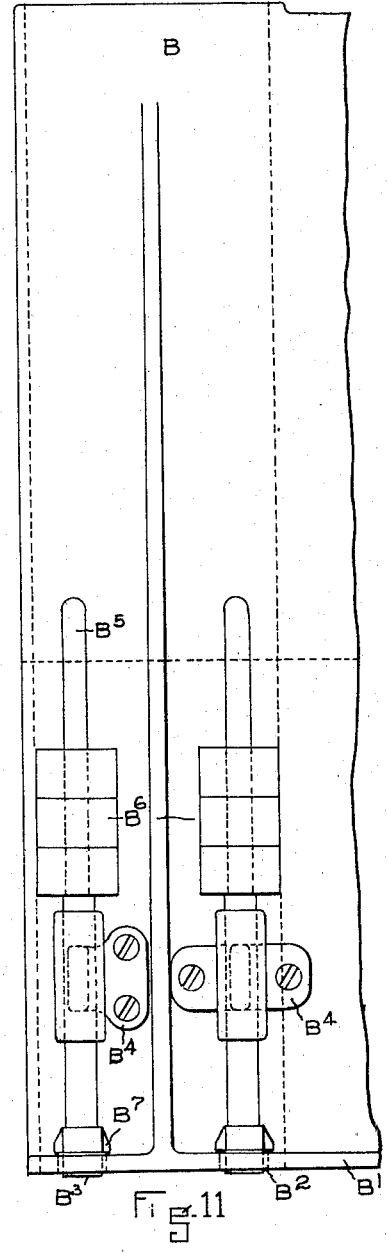
WITNESSES:
INVENTOR.

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 10.
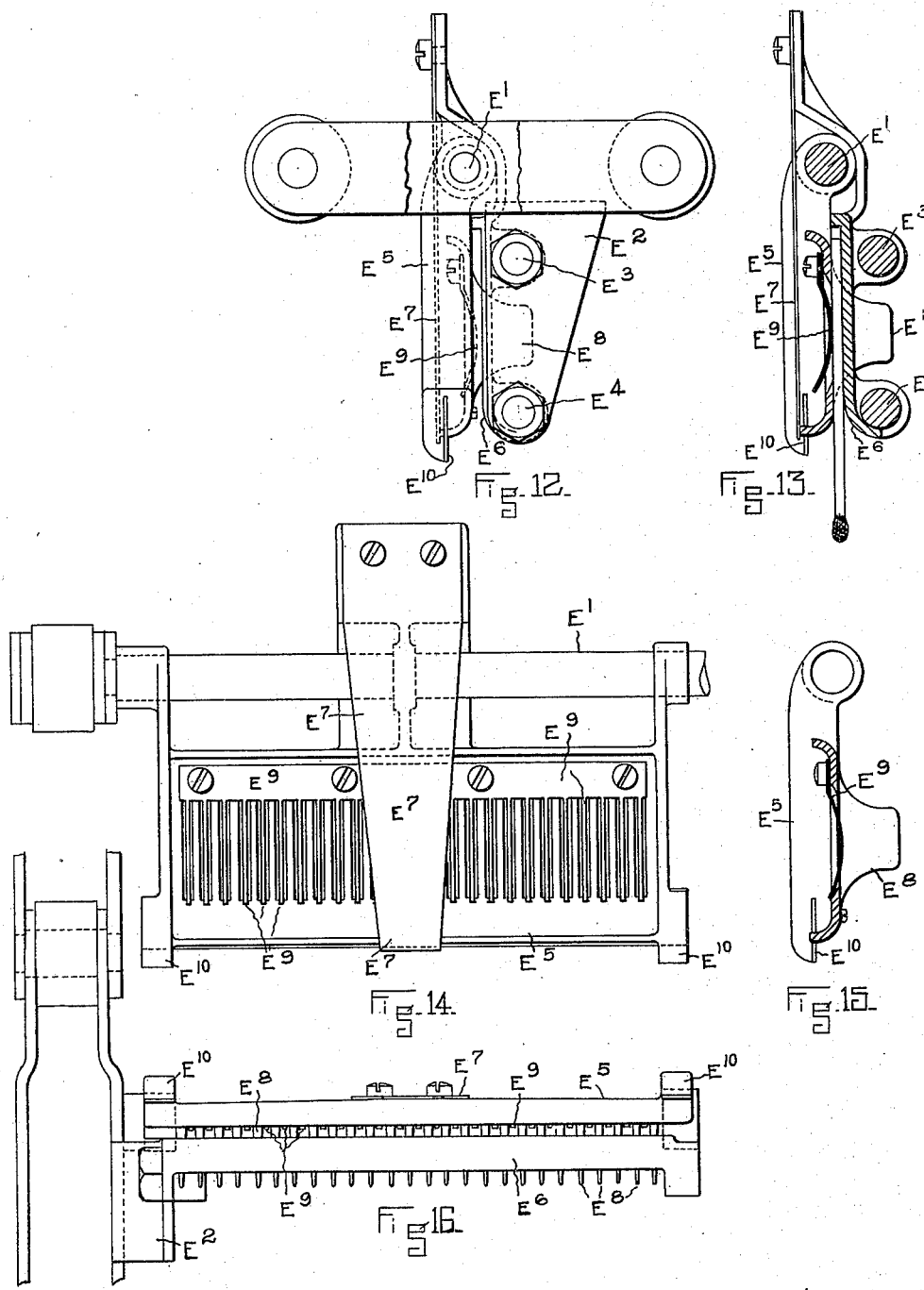

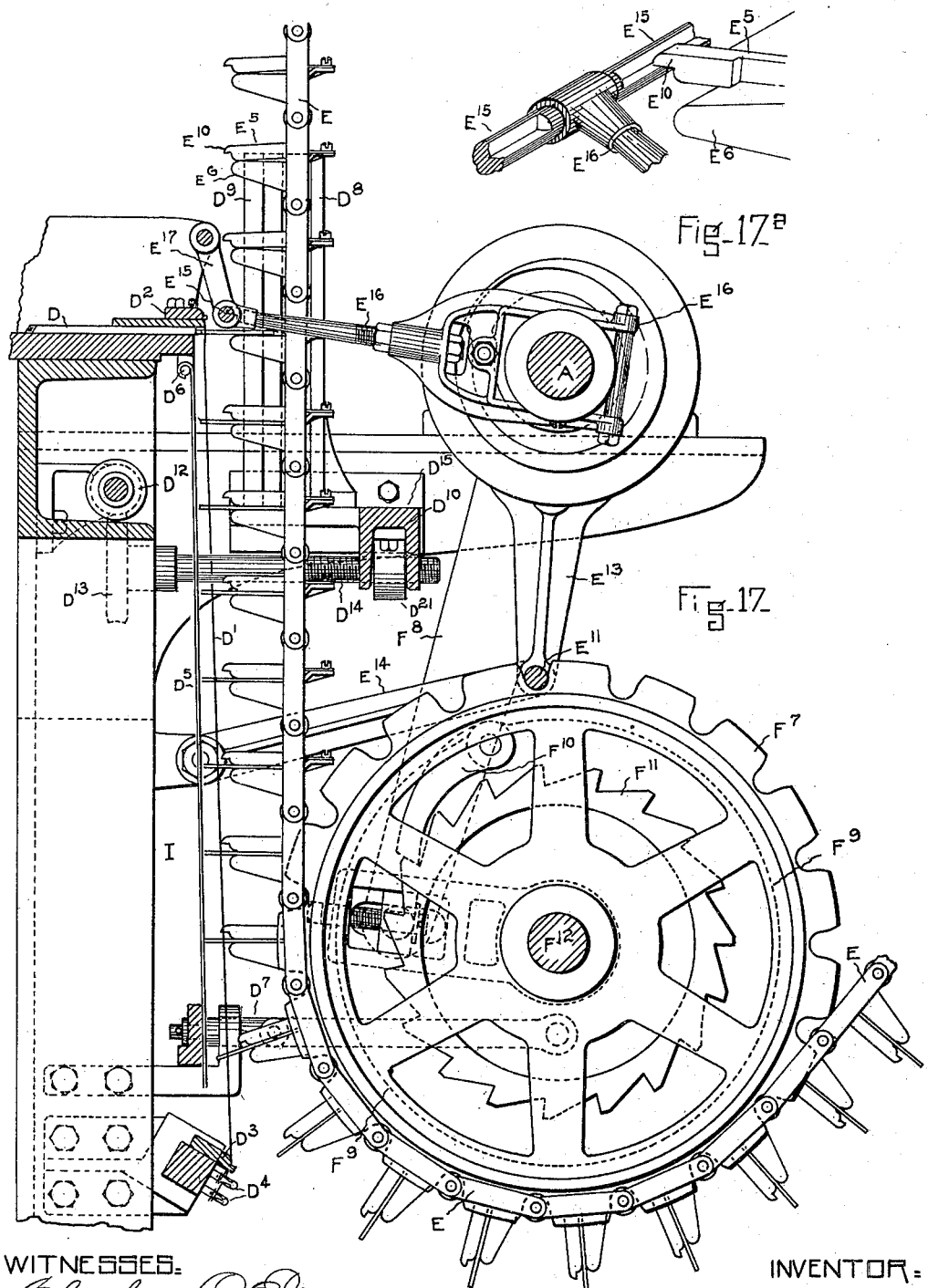

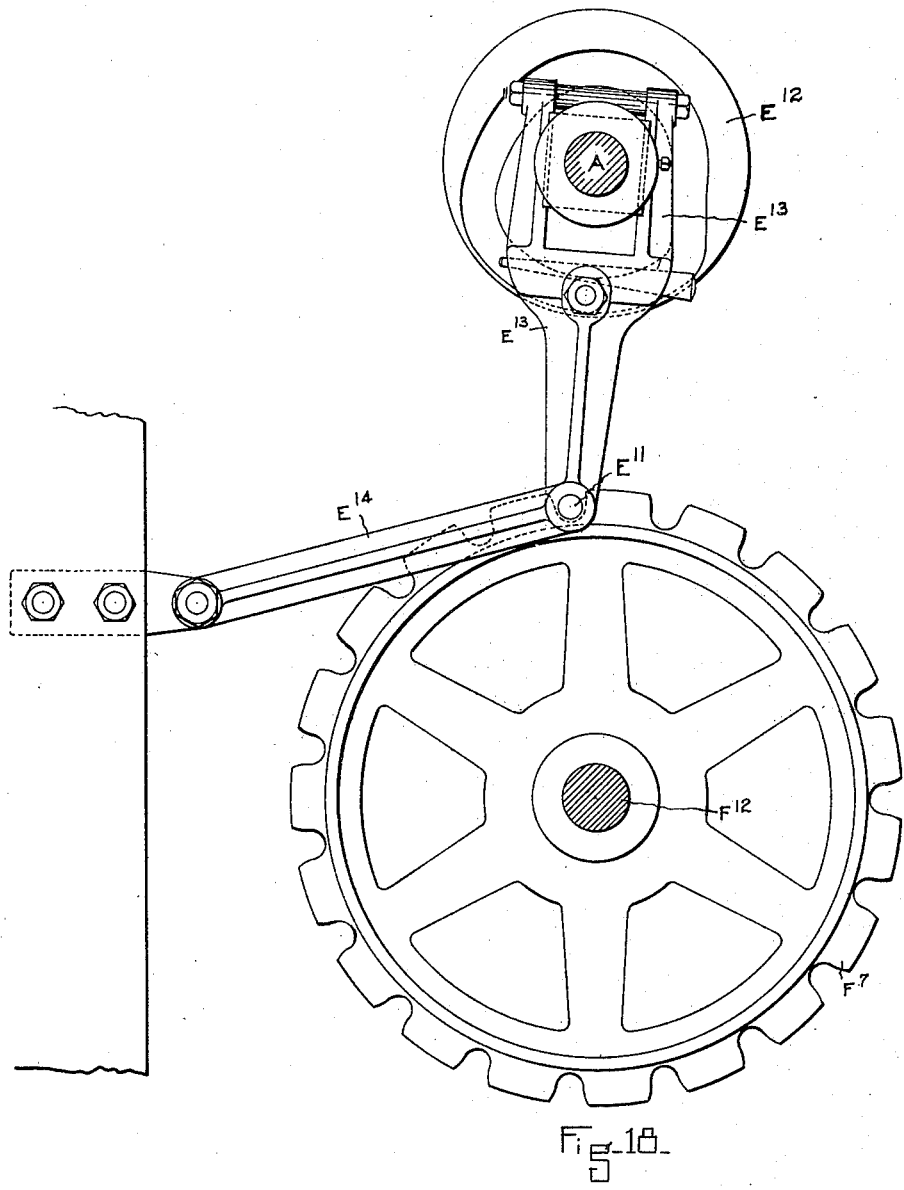

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 13.
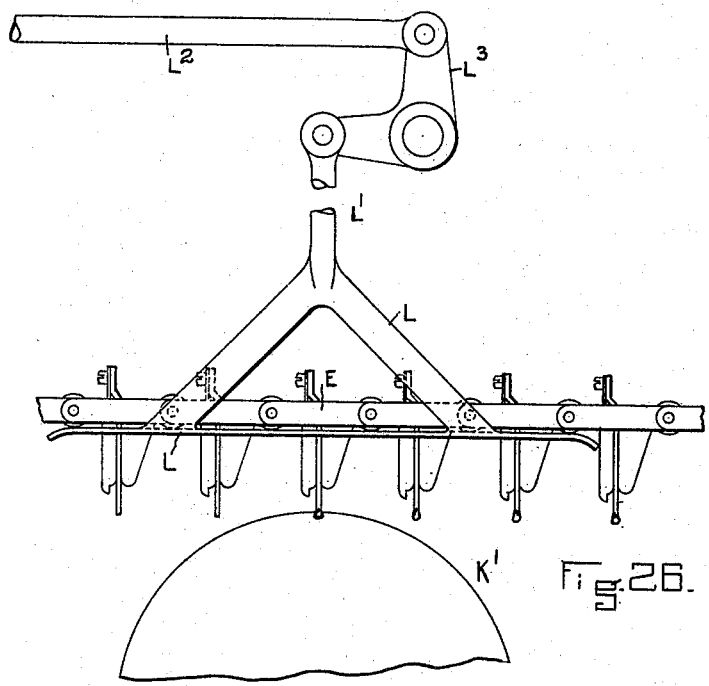
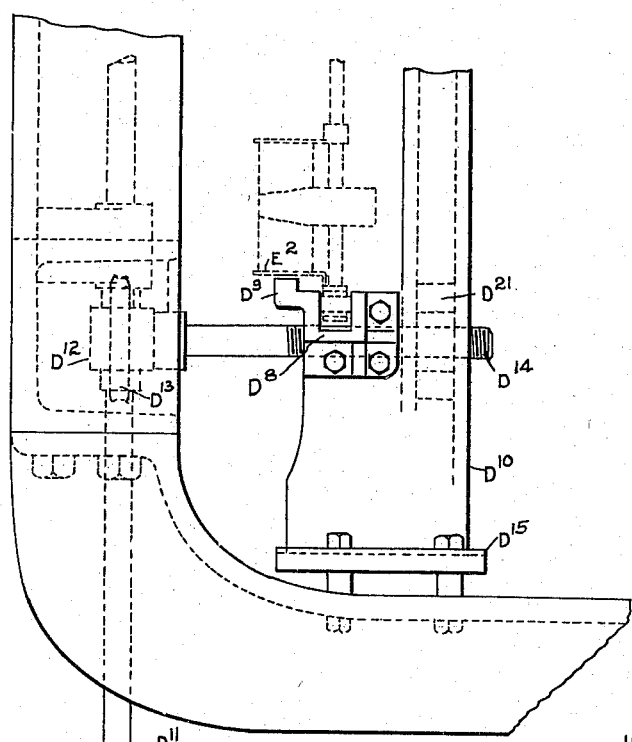

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 14.
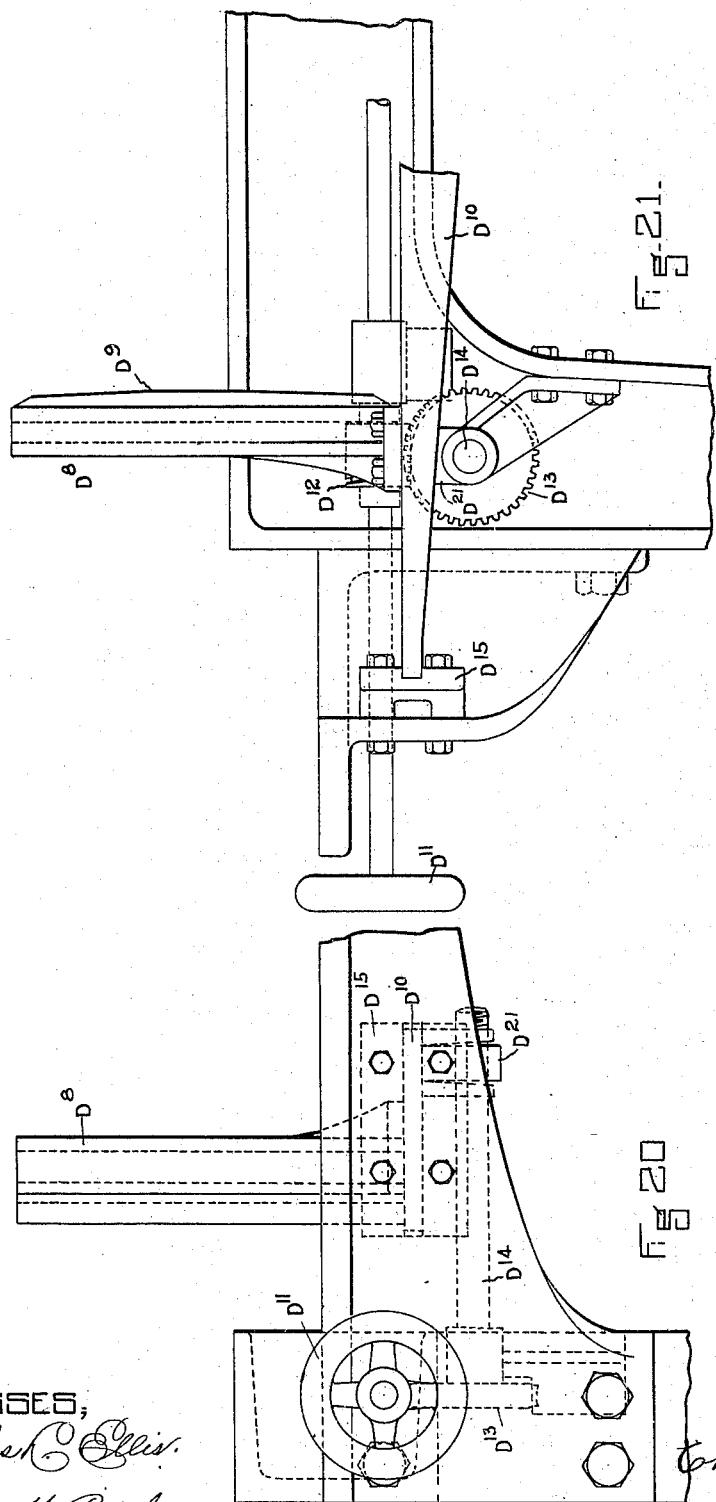
WITNESSES,
Charles C. Ellis.
James W. Ripley
INVENTOR,
Charles Carr

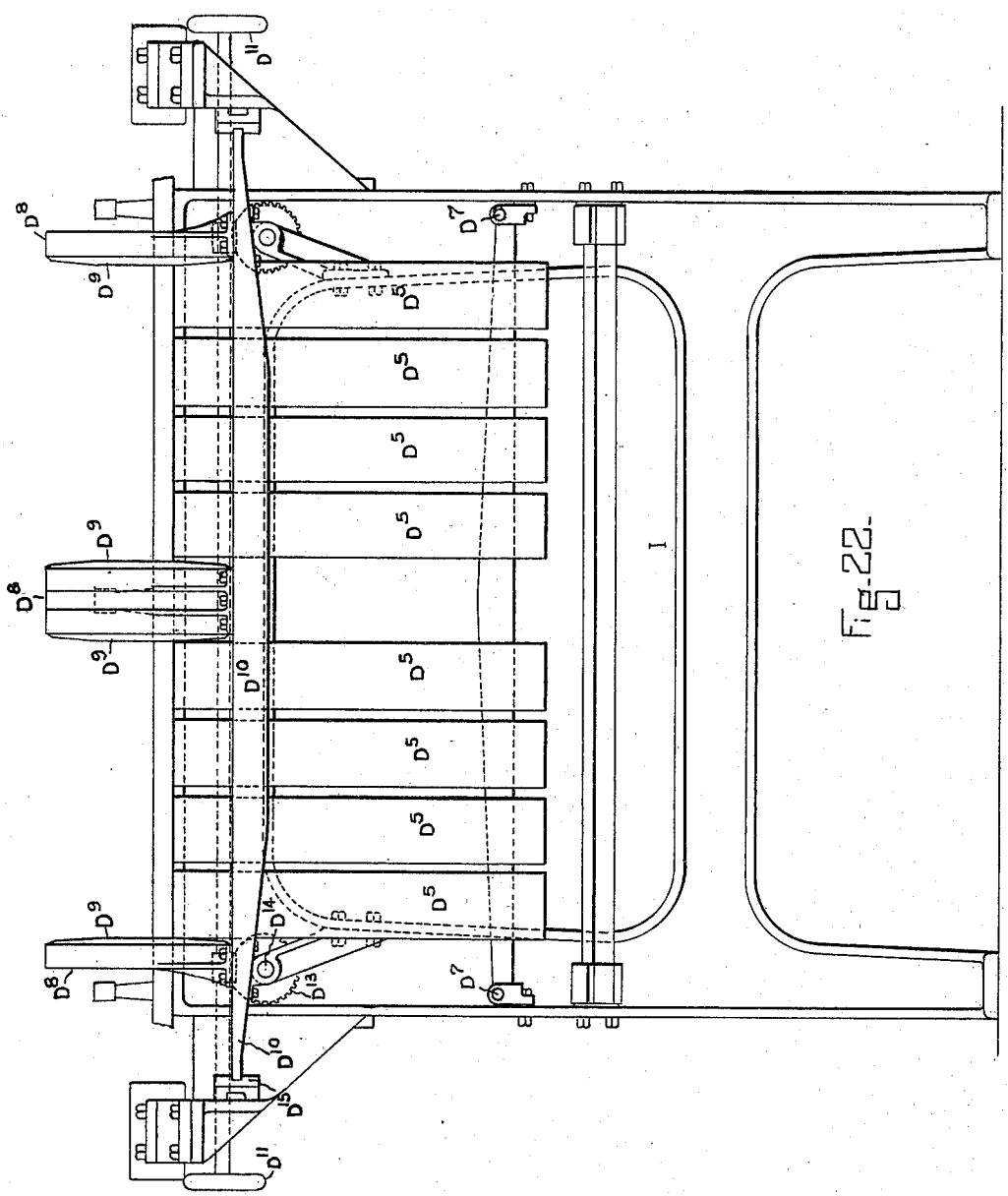

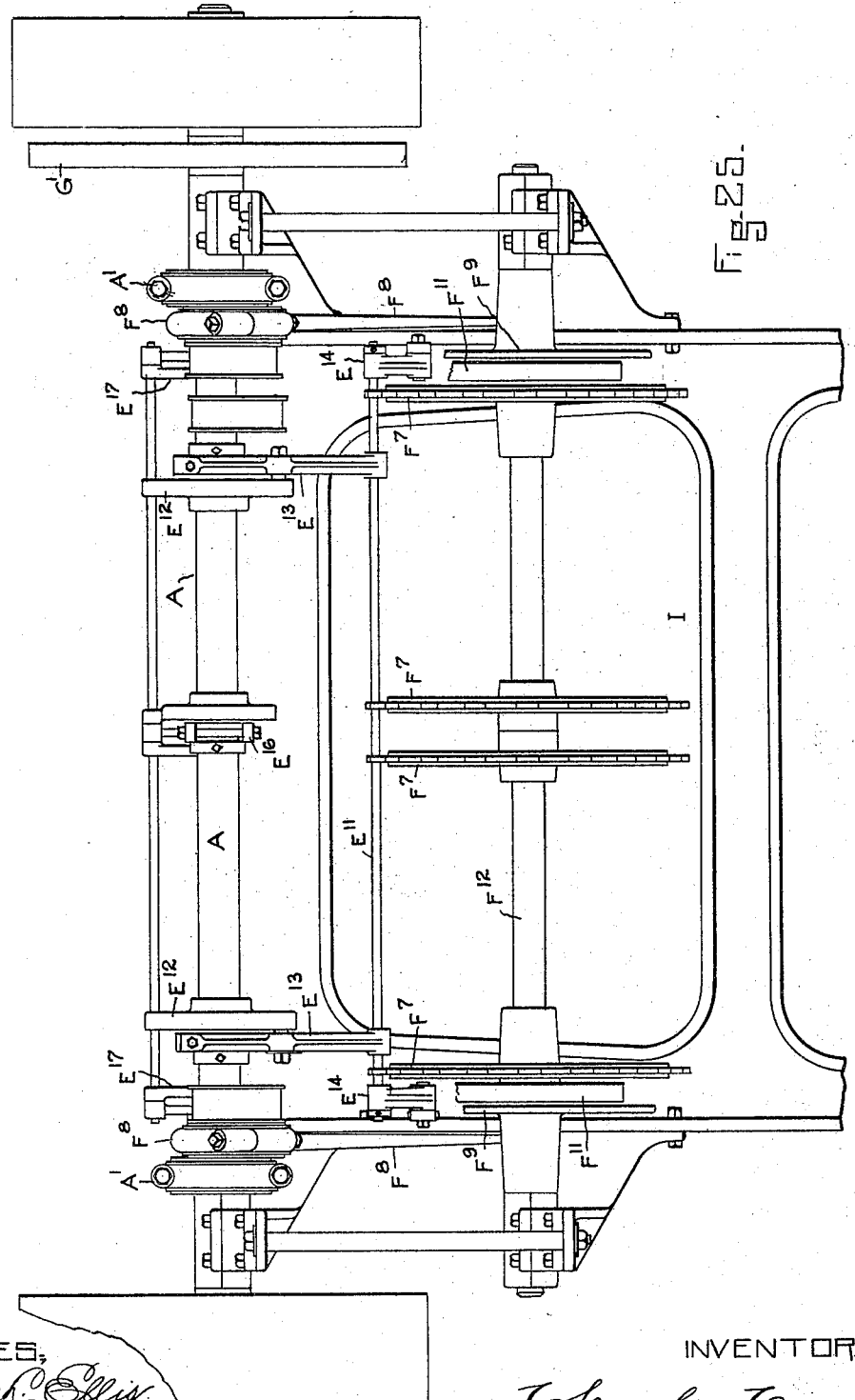

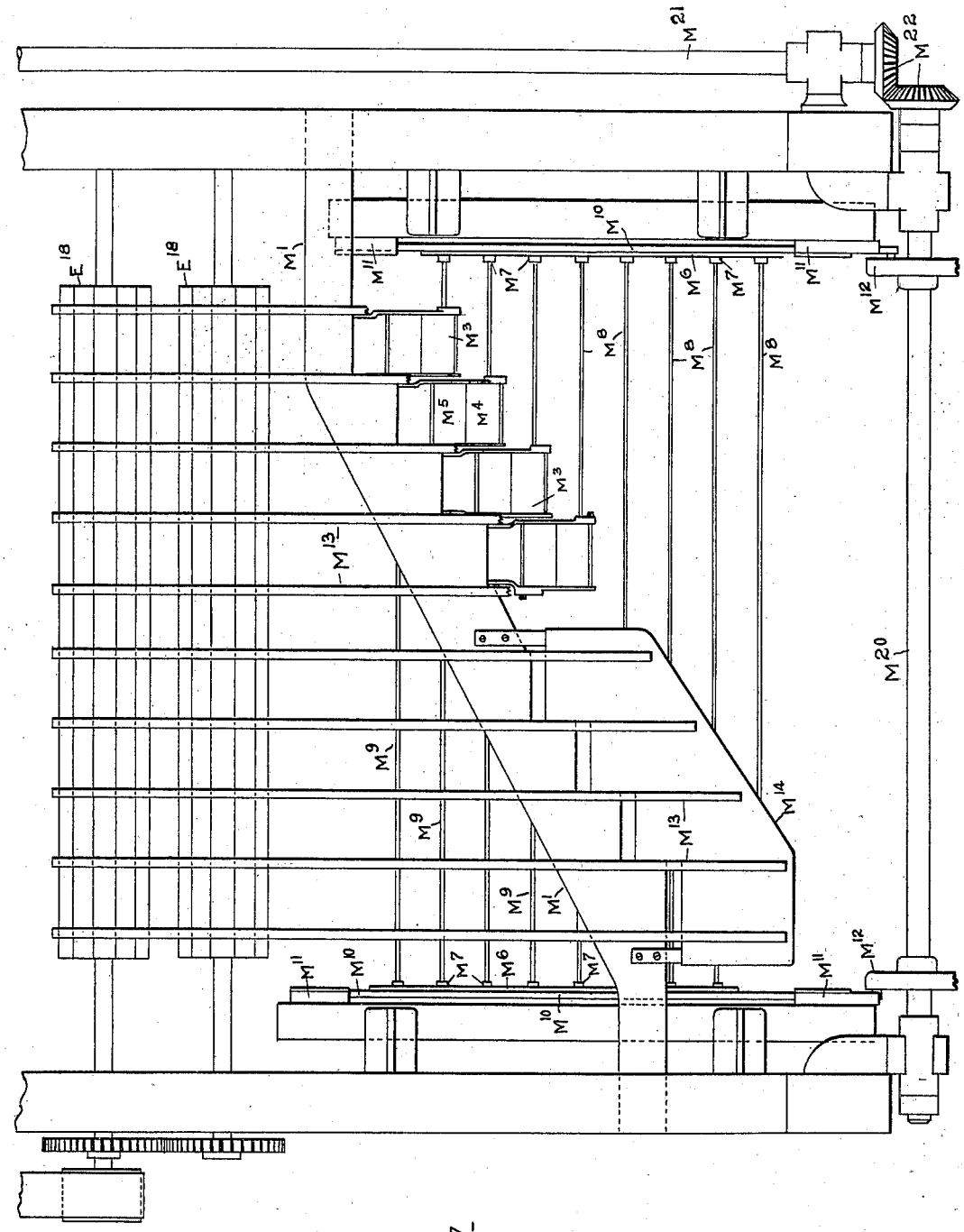

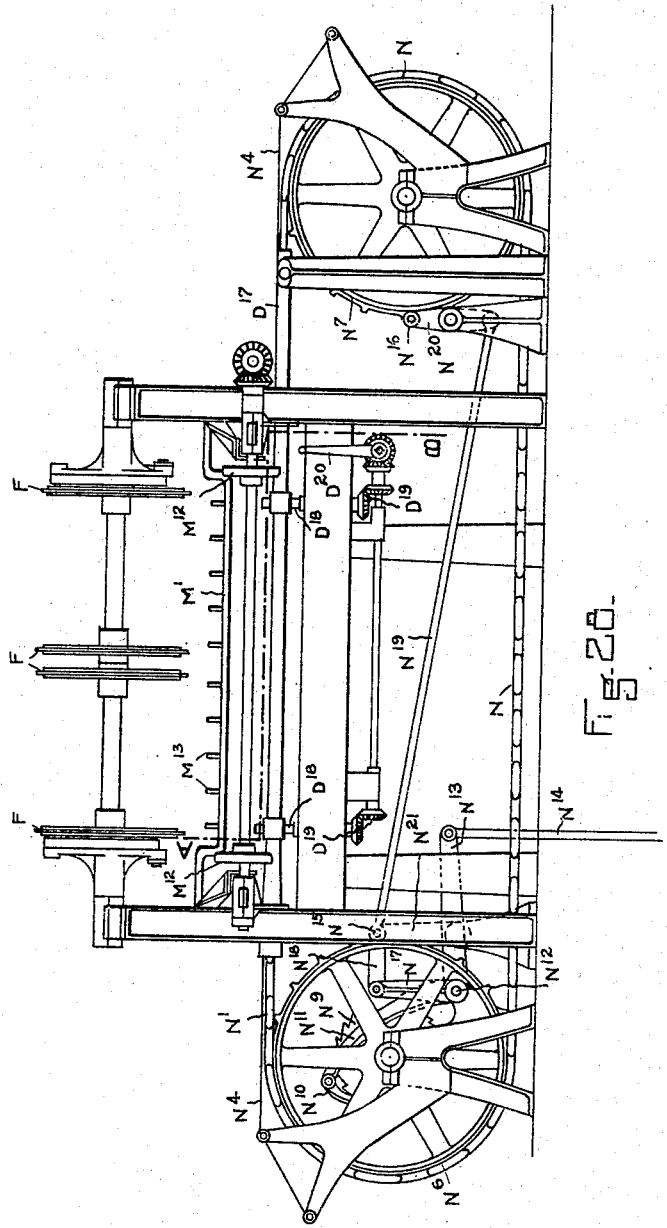

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 20.
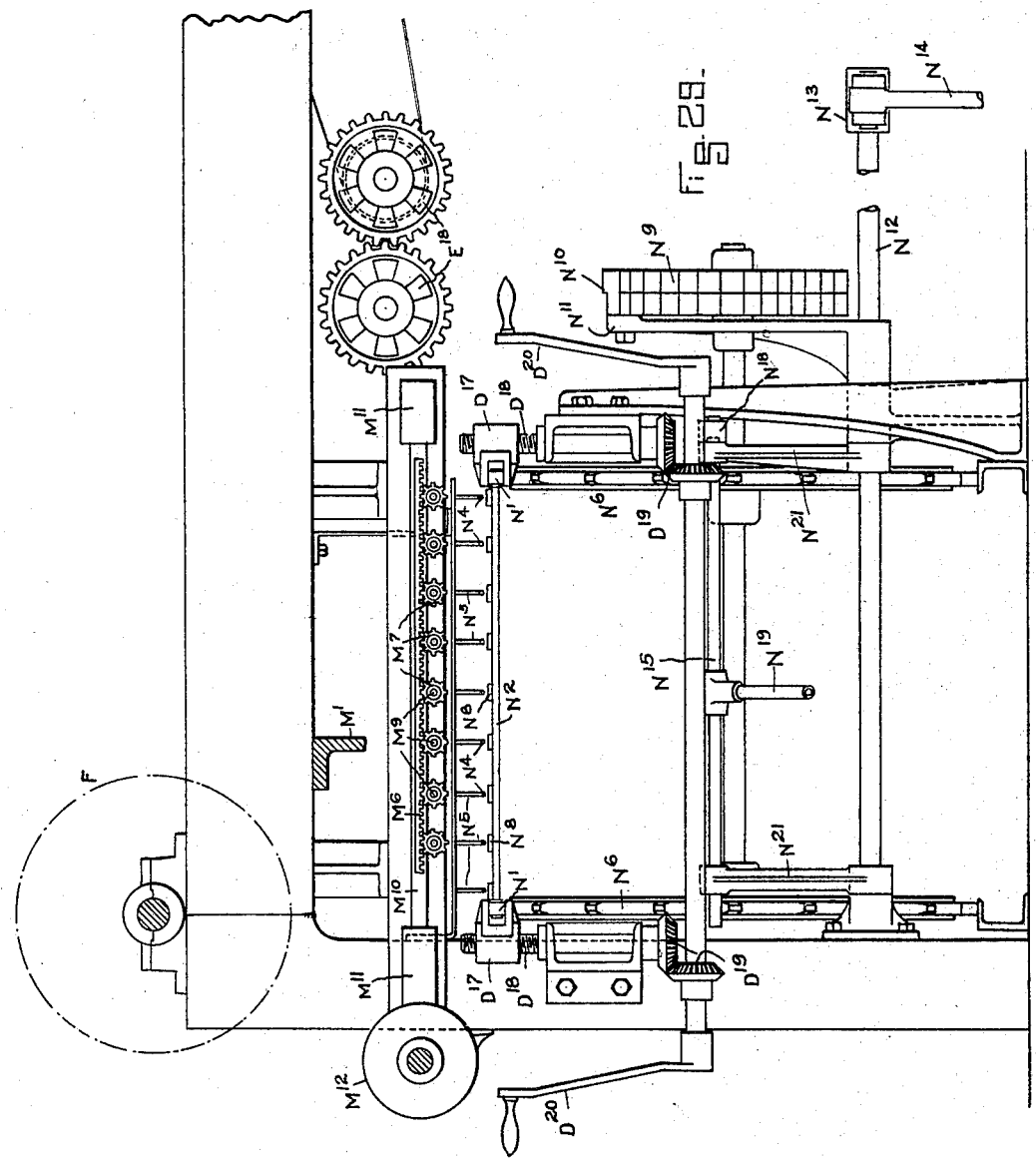
WITNESSES, INVENTOR,

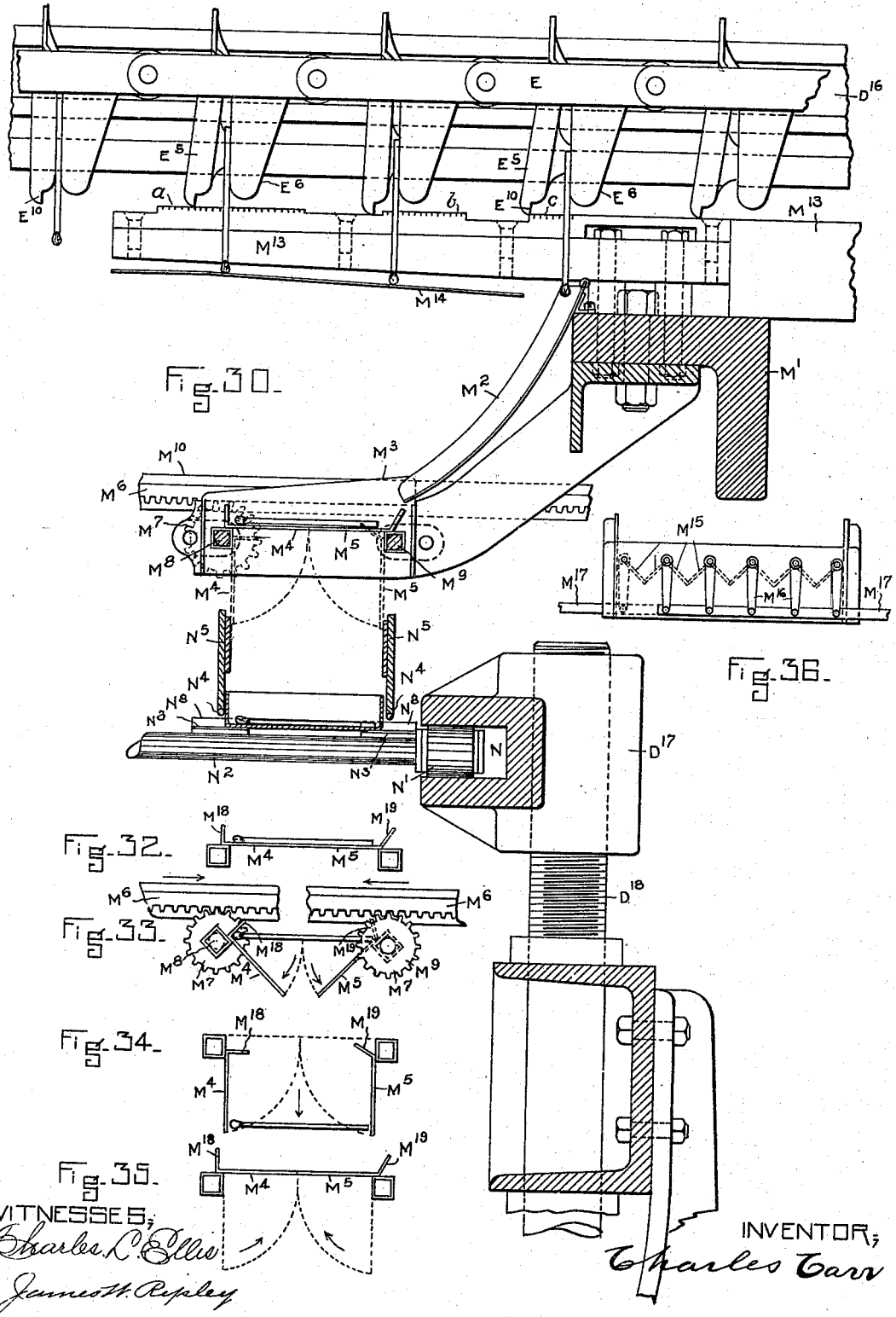

No. 639,357. Patented Dec. 19, 1899.
C. CARR.
MACHINE FOR MAKING AND BOXING MATCHES.
(Application filed Sept. 16, 1898.)
(No Model.) 22 Sheets—Sheet 22.

WITNESSES: Charles L. Ellis
James H. Ripley

INVENTOR: Charles Carr

UNITED STATES PATENT OFFICE.

CHARLES CARR, OF BOSTON, MASSACHUSETTS.

MACHINE FOR MAKING AND BOXING MATCHES.

SPECIFICATION forming part of Letters Patent No. 639,357, dated December 19, 1899.

Application filed September 16, 1898. Serial No. 691,092. (No model.)

*To all whom it may concern:*

Be it known that I, CHARLES CARR, a citizen of the United States, residing at Boston, in the county of Suffolk and State of Massachusetts, have invented certain new and useful Improvements in Machines for Making and Boxing Matches, of which the following is a specification.

My invention relates generally to improvements in machines for making and for boxing matches wherein the match material is supplied to the dividers from chutes, hoppers, or otherwise and is conveyed from the dividers by gripping devices attached to endless chains, belts, or aprons to and past vats or pans containing igniting mixture and other material and thence through drying-sections to the delivery or boxing mechanisms, the latter of which may be either a part of the match-forming machine or an independent machine.

My invention relates more particularly to improvements upon a machine for making and boxing matches at a single operation patented by Joseph Boulard August 23, 1892, No. 481,522, and also to improvements upon a similar machine described in an application for patent by said Boulard filed May 14, 1896, Serial No. 591,739; and it consists of the arrangement and combination of the several parts, as hereinafter set forth, comprising, among other new features, improved mechanism for driving the match material from the receiving chutes or hoppers through and past the dividers into the conveyer-grippers, improved mechanism for controlling the feeding of match material from the receivers, improved construction of the match-gripping devices, improved system for effecting a variable movement of the match-conveyer, improved method of dipping the match-splints into the igniting mixture, improved mechanism for discharging matches from the conveyer-gripping devices and for depositing the matches into boxes, and improved means for guiding and steadying the match-conveyer and the match-box conveyer and for stopping the movement of the same, which various improvements and additions are fully described in the following specification, taken in connection with the accompanying drawings, which form a part of the specification.

Figure 9:
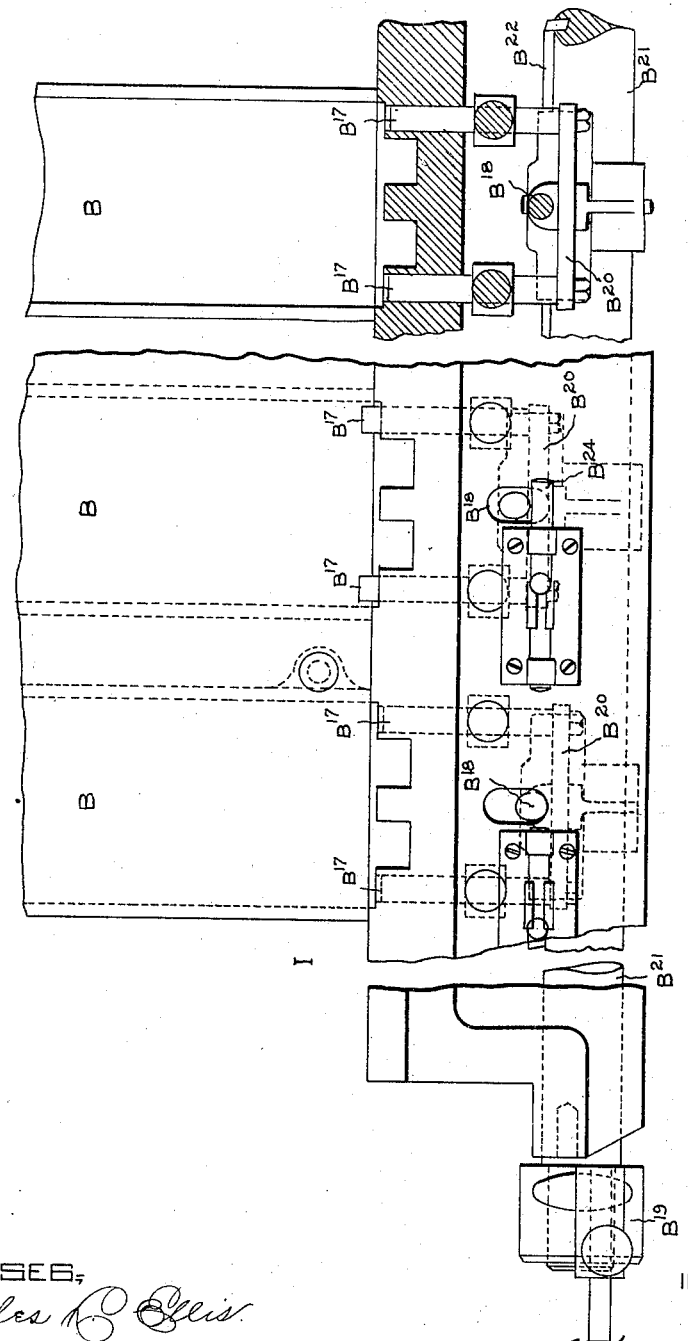
Figures 23, 24:
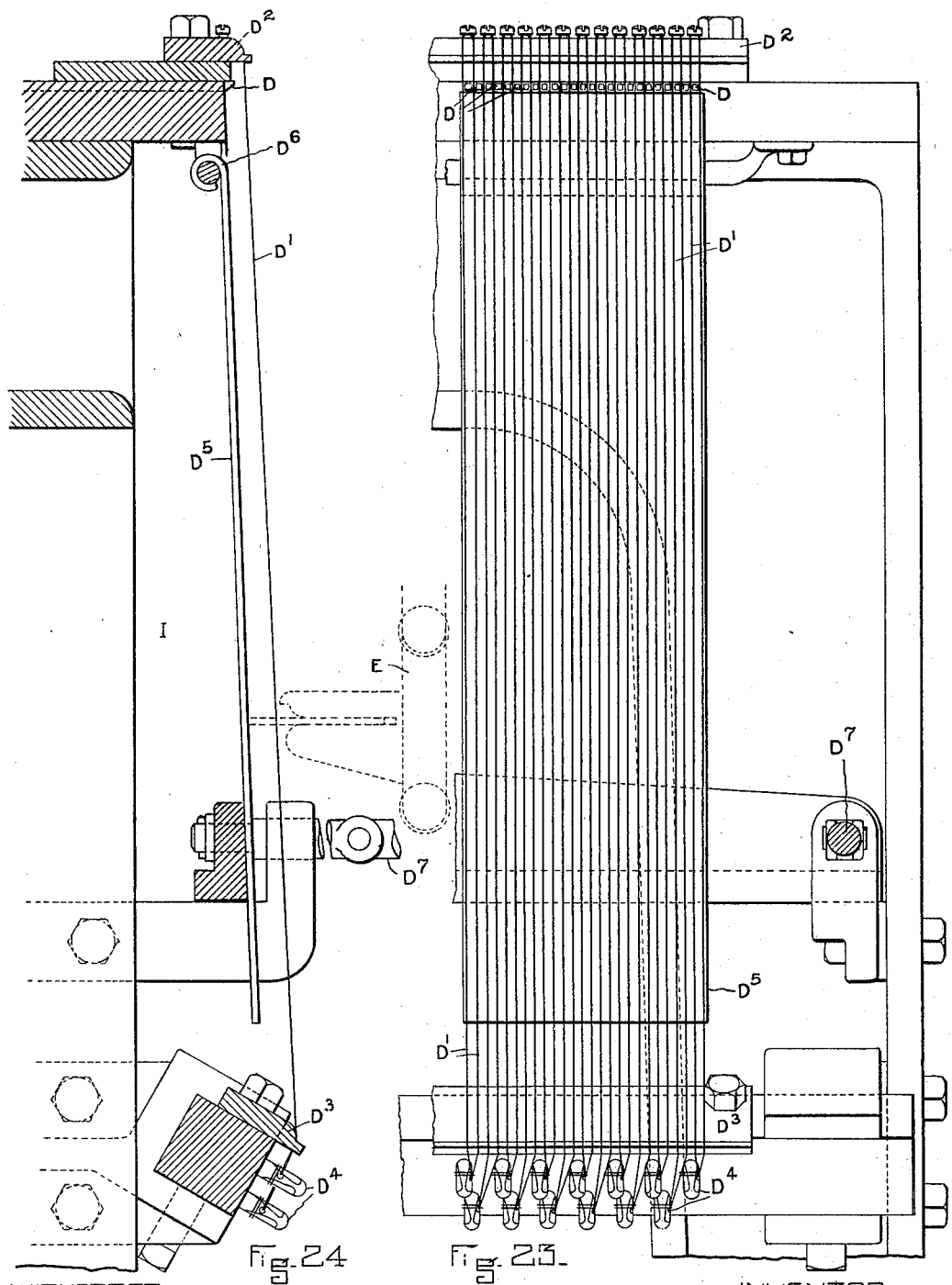
Figure 31:
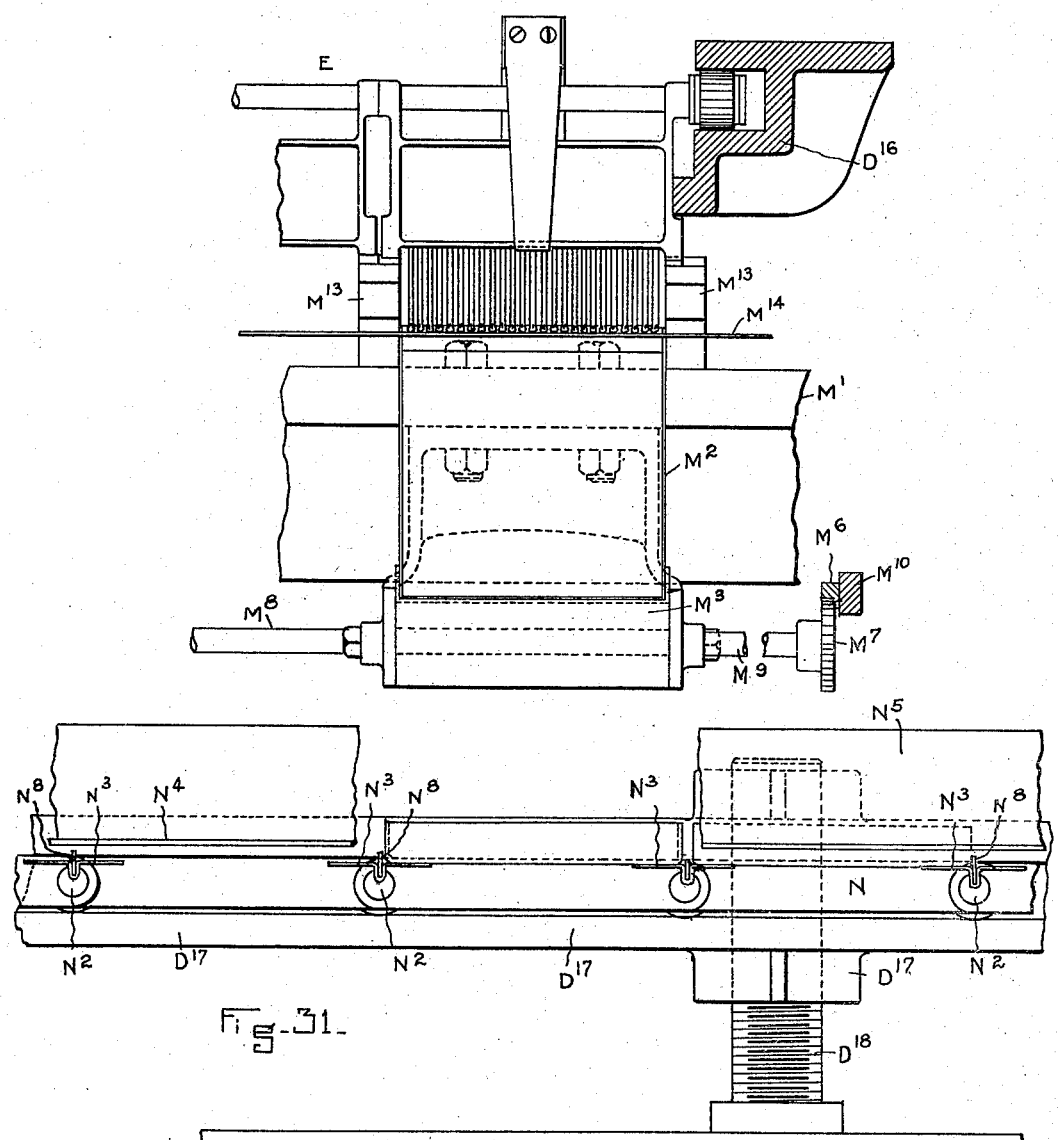

In the drawings, Figure 1 is a side elevation of the entire machine, showing the splint forming, dipping, drying, and match-boxing sections of the machine in their general relation to each other. Fig. 2 is an end elevation of the same viewed from the left in Fig. 1. Fig. 3 is an end elevation of the same viewed from the right in Fig. 1. Fig. 4 is a plan view of the machine with the splint-forming section indicated in outlines and omitting the boxing mechanism and dipping-section. Fig. 5 shows the essential mechanism for driving and carrying the match-conveyer. Fig. 6 is an elevation of Fig. 5 viewed from the right. Fig. 7 is a sectional elevation corresponding to Fig. 1, left-hand of splint-forming section I, showing one of the hoppers B, the mechanism for feeding match material to the saws, and the devices for controlling the feed both automatically and manually. Fig. 8 is a plan view of parts shown in Fig. 7. Fig. 9 is a front elevation of parts shown in Fig. 7, partly sectional. Figs. 10 and 11 illustrate the pressure-foot in detail, shown in Fig. 7, in its relation to other attachments of the hopper. Figs. 12, 13, 14, 15, and 16 show in detail the construction of the match-conveyer. Fig. 17 is a sectional view at the delivery end of the splint-forming section of the machine, showing the device for arresting the movement of the conveyer E, the conveyer-jaw-opening trip, match-splint evener-plate, guide-wires, and vertical conveyer-guide. Fig. 17$^a$ is an enlarged view of the trip-bar E$^{15}$ and its operating-lever E$^{16}$, shown in connection with the trip-fingers E$^{10}$ and conveyer-jaws E$^5$ and E$^6$. Fig. 18 shows the conveyer-stop in detail. Fig. 19 is a sectional plan of the vertical conveyer-guide. Fig. 20 is a sectional side view of the same. Fig. 21 is a sectional end view of the same. Fig. 22 is a view of the rear end of the splint-forming section of the machine, showing relative location of the vertical conveyer-guide and attachments and the evener-plates. Fig. 23 shows a front view of one of the groups of spacing-wires and one evener-plate with adjacent parts of the machine. Fig. 24 is a side view of the same. Fig. 25 is a rear end view of the splint-forming section of the machine, showing the main shaft with eccentrics for driving the various mechanisms of the machine and with cams for operating the various stop movements. Fig. 26 shows the details of the mechanism for effecting the immersing of the ends of the match-splints in the igniting mixture, which mechanism is in Fig. 1 shown in its relation to other parts of the machine. Fig. 27 is a plan view of the boxing-section of the machine, showing the diagonal supporting-bar carrying the match-depositing mechanism, the cams and connecting parts for operating the tray-flaps, the trip-rails for opening the conveyer-jaws, one of the inclined runways, and the brushes for clearing out the conveyer-jaws. Fig. 28 is an end view of the boxing-section, showing a side view of the match-box conveyer in its relation to the boxing mechanism, the guiding, elevating, and depressing mechanism for adjusting the position of the box-conveyer, the wire guides with attached vertical guide-strips, the sprocket-stops and their various operating parts, and the ratchets, pawls, and connections for moving the box-conveyer. Fig. 29 is a side view of the boxing mechanism and an end view of the box-conveyer on a line A B of Fig. 28 and shows more clearly the mechanism for adjusting the position of the latter, the wire and strip guides in their relation to the conveyer, the cams, ratchets, and racks for operating the tray-flaps, and the brushes which clean out the gripping devices. Fig. 30 is a side view, partly sectional, showing the curved match-chutes, the tray with matches shown as lying on the closed flaps, a match-box resting on the conveyer between the wire and metal strip guides, and with matches represented as having been deposited therein by the action of the flaps, the box-conveyer-adjusting screw and channeled guideway, shown more completely in Fig. 28, and a section of the match-conveyer dropping matches from the grippers onto the runway and into the chutes, while the gripping-jaws are held open by the action of the trip-rail on the trip-fingers of the swinging jaw. Fig. 31 is a view of parts shown in Fig. 30, view-point from the left. Figs. 32, 33, 34, and 35 are diagrammatic illustrations of the action of the tray-flaps when depositing matches into boxes, Fig. 33 showing in particular the action of the operating racks and pinions. Fig. 36 is another form of match-depositing mechanism, substantially equivalent to the device shown in other figures.

In the following description of the construction and operation of the machine I will designate as "match-blanks" the rectangular sections of wood or other suitable material which are supplied to the machine, and which blanks after passing through the saws or other dividers become match-splints, and which splints after passing through the dipping and drying sections of the machine become completed matches.

*General description of operation, Figs. 1, 2, 3, and 4.*—In the splint forming section I of the machine, Fig. 1, is shown on the left one of a row of stationary hoppers B, in which are piled the match-blanks previously prepared, and which blanks have been shaped to the designated length and thickness of the proposed match and of a width allowing the blanks to be divided into the requisite number of matches. By the automatic movement of the various mechanisms of the machine, all of which, except the saws, are actuated by the main shaft A, and which automatic mechanisms will be hereinafter more minutely described, the match-blanks are intermittently and separately pushed from the receiving-hoppers B onto and past gangs of saws on arbor C' or other effective dividers and as separated match-splints through suitable guideways into the gripping devices of the main conveyer E. This conveyer E is constructed in part of endless sprocket-chains and is indicated in Fig. 1 by a dot-and-dash line. The conveyer travels, carrying its load of match-splints, in the direction shown by the arrows around and over various sprocket-wheels to the paraffin-tank J and the igniting-mixture tank K, and thus onward, as may be traced by the arrows, through the drying-section of the machine, III, to the boxing-section IV, where the completed matches are discharged into match-boxes ready for sale in such a number to each box as may be predetermined and automatically provided for. The match-boxes are brought into proper position to be filled with matches by a secondary or box conveyer N, and by which conveyer the boxes are removed when filled.

*Varying movements of the match-conveyer, Figs. 1, 5, and 6.*—The movement of the match-conveyer E is intermittent through that part of its circuit where it receives its load of match-splints, section I, and again where it discharges its load of completed matches, section IV, the conveyer being at rest at the instant when receiving and also when discharging its load. While passing through the dipping and drying sections II and III of the machine, the movement of the conveyer E is constant and uniform. This change in the movement of the conveyer E is necessary to the efficient and economical operation of the machine, as practical operations have demonstrated the fact that while it is imperative that the movement of the conveyer coincide with other intermittently-moved mechanisms of the machine at certain points in the conveyer-circuit it is a waste of power and too great a strain on the mechanism to continue the intermittent movement of the conveyer through other portions of its travel. The change in the movements of the conveyer from an intermittent movement of equal and regular pulsations to a constant movement, regular and uniform, is effected as follows:

The sprocket-wheel F, Figs. 1 and 5, upper left-hand side, is driven by means of the pawl F', operating on the ratchet-wheel $F^2$, and connected to an eccentric on the main shaft A through rods $F^4$ and $F^5$ and disk $F^6$. The sprocket-wheel $F^7$ is also driven by an eccentric arranged to operate simultaneously with the former eccentric on the main shaft A through the eccentric-rod $F^8$ and disk $F^9$, to which disk is secured the pawl $F^{10}$, operating the ratchet-wheel $F^{11}$.

As the action of the pawls on the ratchet-wheels is necessarily intermittent, the movement of the sprocket-wheels F and $F^7$, secured to same shafts with the ratchet-wheels, must be intermittent, as also must be the movement of that section of the conveyer E which in its circuit is carried by the sprocket-wheels F and $F^7$. The sprocket-wheels $F^3$ and $F^{13}$ are simply idlers and derive their movement from the conveyer-chain.

The constant movement of the conveyer is effected by means of spur, miter, bevel, and worm gears (shown in Figs. 1, 5, and 6) as follows: By the main shaft A is revolved the spur-gear $G'$, driving a similar spur-gear $G^2$ on shaft $G^3$, on which shaft are the miter-gears $G^4$, driving the vertical shafts $G^7$ and and $G^8$ by means of the miter-gears $G^5$ and $G^6$. These vertical shafts actuate the horizontal counter-shafts $G^9$, $G^{10}$, $G^{11}$, and $G^{12}$ through bevel-gears and pinions $G^{13}$. On these horizontal counter-shafts are the worms $G^{14}$, driving worm-gears which turn the shafts on which are keyed the sprocket-wheels $G^{15}$, $G^{16}$, $G^{17}$, $G^{18}$, $G^{19}$, $G^{20}$, $G^{21}$, $G^{22}$, $G^{23}$, and $G^{24}$. All sprocket-wheels are arranged in opposite pairs, each one of the pairs carrying one of the two connected sprocket-chains of which the conveyer is in part composed.

As the main shaft A revolves constantly and uniformly, it will be seen that the sprocket-wheels $G^{15}$ to $G^{24}$ must revolve in the same manner and that the section of the conveyer E which is carried by these sprocket-wheels must also be constant and uniform in movement.

The conveyer E is so arranged on the sprocket-wheels that those sections which are passing between sprockets $F^3$ and $G^{15}$ above and $F^7$ and $G^{25}$ below are sufficiently slack to allow an equalization of the two movements of the conveyer, the sag in the chain varying intermittently. This equalization is effected by adjusting the mechanism above described in such a manner that while all the sprocket-wheels make a full revolution in the same period of time the intermittently-moved sprocket-wheels are at rest during the time required for the constantly-moved sprocket-wheels to move a distance equal to half the length of a link of the conveyer sprocket-chain. Then the intermittently-moved sprocket-wheels are driven forward by their pawls and ratchets at double speed, making up the lost time, and thereby equalizing the movement of the conveyer. It is during these intervals of rest that the match-blanks are thrust into the gripping devices of the conveyer, as hereinafter more particularly described.

The sprocket-wheels $G^{15}$ to $G^{24}$, on which the match-conveyer is carried through the dipping and drying sections of the machine, are all drivers operated simultaneously by worms and worm-gears and are located with particular reference to the processes to which the match-splints and matches are subjected. By this arrangement the strain on the conveyer is reduced to a minimum, and it is carried onward in a true, steady, and even movement, thereby promoting the effective and more perfect action of coöperating parts of the machine.

*The hopper and coöperating parts, Figs. 1, 7, 8, 9, 10, and 11.*—The hopper B, any desirable number of which may be used, is of rectangular section, is of the proper dimensions to hold a number of match-blanks in the required position, and is constructed without top or bottom, the match-blanks being supported on projections which are a part of the movable platen $B^8$, Figs. 7 and 8. This platen extends across the full width of the machine and is driven backward and forward under the hoppers by the reciprocating side bars $A^2$, Fig. 1, which are attached to opposite ends of the platen, one on either side of the machine. The side bars $A^2$ are actuated by the eccentric $A'$ on the main driving-shaft A, Fig. 1, and their reciprocating movement is identical in time and length of stroke with other intermittently-moved parts of the machine.

Attached to the platen $B^8$ in a manner hereinafter fully described is the platen-tongue $B^9$, one tongue for each hopper. As the platen $B^8$ is pulled forward—*i. e.*, toward the saws—by the side bars $A^2$ the beveled end of the tongue $B^9$ engages the exposed edge of the undermost match-blank in the hopper and pushes the blank toward the saws, which are arranged as near the hoppers as practicable in gangs of any required number. The movement which the platen receives through the side bars is equal to the length of a match-blank plus clearance, its forward movement, as has been stated, pushing a match-blank toward the saws. In Figs. 7 and 8 the platen and platen-tongue are shown as having been driven to the extreme forward position. At the cessation of this forward movement of the platen and its match-blank-driving tongue the match-blank, which has been thereby pushed forward, is held from returning when the platen-tongue recedes by friction or by pressure applied in any suitable manner (see $B^3$, Fig. 7) and the match-blank which was immediately above it in the hopper and which has been upheld during this forward movement on the upper surface of the platen-tongue drops from the surface of the platen-tongue to the surface of the platen at the end of the backward movement and is left in a position to be in turn pushed toward the saws by the repeated forward movement of the platen-tongue. This process being regularly repeated, a continuous line of match-blanks is intermittently driven toward the saws or other dividers, the rear ones pushing those in advance. The match-blanks thus pushed forward are guided through the saws by top and bottom plates and emerging from the saws in the form of separate match-splints continue to be pushed forward through suitable individual guides (preferably square metal tubes whose internal dimensions slightly exceed the thickness of a splint) until they reach and enter the open jaws of the conveyer E.

The platen-tongue $B^9$, Figs. 7 and 8, is dovetailed into the platen $B^8$, one tongue to each hopper, and is free to slide backward and forward independently of the movements of the platen when the tongue is not held in place by the stiff spring-plate $B^{12}$, which presses upon or against the lug $B^{10}$, the latter, an immovable part of the tongue $B^9$. The spring $B^{12}$ is held in position and becomes, essentially, a part of the platen $B^8$ by the stud-bolt $B^{13}$, which passes loosely through the long slot $B^{11}$ in the tongue $B^9$ and is embedded in the platen. This slot $B^{11}$, Fig. 8, permits the unimpeded movement of the tongue in the dovetailed groove of the platen when it is released from the grip of the spring.

The tension of the spring $B^{12}$ is adjusted by the thumb-screw $B^{14}$, which also passes through the slot $B^{11}$ and is embedded in the platen. The object of this device is to relieve the match-blanks from the driving action of the platen-tongue $B^9$ when a stoppage accidentally occurs in the forward movement of the line of blanks either in the hopper or between the hopper and the conveyer.

If no provision is made to allow any flexibility of that part of the machine which carries or pushes the match material to the dividers or into the conveyer, an unyielding obstruction to the forward movement of the match material will cause damage to the machine or to the match material.

The tension of the spring $B^{12}$ is so adjusted that when the resistance of the match-blanks (or of the match-splints) to the forward movement of the platen-tongue is abnormal the grip of the spring $B^{12}$ on the tongue is overcome and the contact-surface of the spring slips over the lug $B^{10}$, allowing the tongue to remain stationary at the point where it is affected by the obstruction, and consequently inoperative; but as the platen $B^8$ is still being driven forward and backward by the side bars $A^2$ the tongues attached to the platen at points opposite other hoppers remain unaffected, being independently controlled by their respective springs $B^{12}$. The knob $B^{15}$ is used to move the tongues $B^9$ in proper place for action or to withdraw them, as occasion requires. One relative position of the tongue when inoperative is shown by the dotted outlines to the left in Figs. 7 and 8, and the platen $B^8$ is shown in its position when at the end of its forward movement, (nearest to the saws.)

In order to prevent the match-blanks from being pushed backward toward the hopper by the action of the saws when the platen-tongue $B^9$ recedes, the pressure-foot $B^3$, Figs. 7, 10, and 11, is attached by the bracket $B^4$ to the back of each hopper and, projecting through the aperture $B^2$ in the flange $B'$, rests on the surface of a match-blank which has been pushed underneath it by the forward movement of the platen-tongue. This pressure-foot may have fine teeth or sharp ridges in its contact-surface to insure sufficient friction, and its pressure upon the match-blank may be regulated by the application of more or less of the weights $B^6$, which are strung on the stem $B^5$. The pressure-foot is prevented by the lugs $B^7$ from protruding so far through the aperture when not upheld by a match-blank as to interfere with the forward movement of succeeding match-blanks.

Projecting through the top of the supporting-table I and beneath each hopper B are two lifting-studs $B^{17}$, Figs. 7 and 8, which are raised in separate pairs by the handles $B^{18}$ or all together by the single handle $B^{19}$. By means of this device the match-blanks in any hopper or in all the hoppers together may be raised on the ends of the studs $B^{17}$ above and free from the action of the platen-tongue $B^9$, and thus the feeding of match-blanks from any hopper or from all the hoppers may be instantly stopped without stopping the movement of the driving-shaft A and consequent cessation of the conveying, dipping, and boxing operations of the machine, which operations it may be expedient to continue.

The lifting-studs $B^{17}$ are so located that the platen-tongue $B^9$ passes between them in its forward and backward movements without interference. The studs $B^{17}$ are connected in pairs under each hopper by the connecting-bar $B^{20}$, which is engaged and uplifted by the jaw in the middle portion of the handle $B^{18}$. The handles $B^{18}$ are supported by the shaft $B^{21}$, on which each handle is free to turn only to the necessary position to raise the match-blanks to the required height, and can do this without affecting the studs operating under other hoppers. The shaft $B^{21}$ has a projecting key or ridge $B^{22}$ extending along that part of its length which is beneath the hoppers, and by means of this key all the handles $B^{18}$ may be raised together by one movement of the handle $B^{19}$, which is secured to one end of the shaft $B^{21}$. To accomplish this simultaneous movement, each handle $B^{18}$ has a lateral slot $B^{23}$ in that part of the handle which encircles the shaft $B^{21}$, through which slot the key $B^{22}$ passes; but as the slot is wider than the key each handle $B^{18}$ has an independent movement on the shaft $B^{21}$, limited in extent to the excess in width of the slot over that of the key, but sufficient to allow each handle $B^{18}$ an independent upward movement necessary to raise the blanks in the hopper above to the required height. As one side of the slot $B^{23}$ normally rests against the key $B^{22}$, the turning of the shaft $B^{21}$ by the upward movement of the handle $B^{19}$ causes a simultaneous upward movement of all the handles $B^{18}$ and consequent uplifting of the blanks in all the hoppers until they are all above and free from the action of the platen-tongue B⁹.

Individual sliding bolts B²⁴ are located under each handle B¹⁸ to hold them in an elevated position when required. A pin inserted at will through the handle B¹⁹ keeps all the handles B¹⁸ in the elevated position. In Fig. 9 are shown three hoppers, one in section, and underneath the hopper at the left the lifting-studs B¹⁷ are shown in their lower position, while underneath the middle one of the three hoppers the studs are shown as raised by the uplifting of their handle to the position necessary to keep the blanks in the hopper from the action of the platen-tongue.

*The main conveyer, Figs. 1, 12, 13, 14, 15, and 16.*—The main conveyer E is constructed as follows: Two lines of endless sprocket-chain made up of links and rivets on the plan of an ordinary machine-chain are connected by the rod E', Figs. 12, 13, and 14, which extends from the middle of the inner links of one line of chain to the corresponding inner links of the companion chain. Projecting from each inner link at right angles to the rod E' are the rigid arms E², each opposite arm connected by the two rods E³ and E⁴, which are parallel to the rod E'. On these three rods are suspended and operated groups of gripping devices. One of these groups is shown in Figs. 12 and 16. These groups of grippers each consist of two jaws—one swinging and the other rigid. The swinging jaw E⁵ is hinged on the rod E', while the rigid jaw E⁶ is immovably held on the rods E³ and E⁴. The jaws are maintained normally in a closed position by the stiff spring E⁷, which is secured to a projection of the jaw E⁶ and which presses against the top of the swinging jaw E⁵. The swinging jaw E⁵ is constructed with a row of projecting match-splint separators E⁸, which extend through corresponding orifices or slits in the surface of the rigid jaw. Alternating with these separators in the swinging jaw are also slits, through which slightly project convex springs E⁹ or any suitable form of individual spring, by means of which the match-splints are firmly gripped, each separate splint being held between a spring and a solid bar, the latter forming that part of the surface of the rigid jaw E⁶ which extends between the slits receiving the separators E⁸. Thus each splint is separately inclosed and firmly gripped in a tube-shaped orifice, two sides of which are formed by the separators E⁸ and the other two sides by one of the springs E⁹ and a solid and immovable bar, the latter a part of the surface of the jaw E⁶. If the orifices in the grippers when the jaws are closed are all of the same dimensions, the grippers are defective, inasmuch as the match-splints seldom issue from the dividers uniform in size, and consequently the smaller splints or matches are not always firmly gripped, and they are likely to drop out of the grippers while in transit. The individual gripping-springs E⁹ herein described are intended to overcome the defect above mentioned.

By means of the projecting trip-fingers E¹⁰, which are engaged by suitable detents or trippers, the jaws of the conveyer E are held open when they are opposite the points where the load of match-splints is received and again where the completed matches are discharged into the match-boxes. In the machine herein described two separate conveyers E are used, driven by the same mechanism. Any desired number of conveyers may be used, the hoppers, saws, and other coacting parts to be increased correspondingly.

*Conveyer stops and guides, Figs. 17, 18, 19, 20, 21, 22, and 25.*—In order to insure the stoppage of the conveyer E in its intermittent movement when exactly opposite the point where it receives the match-splints as they come from the saws through the guide-tubes D, Fig. 17, the stop-bar E¹¹, Figs. 17 and 25, is applied at the instant when the open jaws of the conveyer E are in line with the delivery ends of the guide-tubes. This is effected by the cam E¹², Fig. 18, revolved by the main shaft A and operating through the sliding-fork connection E¹³. The stop-bar is braced against the thrust of the sprocket-wheel teeth and is guided into place by the arm E¹⁴. It extends across the width of the conveyer and engages the teeth and stops the movement of the pair of opposite sprocket-wheels F⁷.

The opening of the conveyer-jaws when they are at the proper point opposite the delivery ends of the guide-tubes D to receive the match-splints is effected by means of the trip-bar E¹⁵, Fig. 17 and detail of E¹⁵, operated by the forked cam-rod E¹⁶, which is driven by a cam on shaft A and is guided by the swinging arm E¹⁷. As the empty jaws of the conveyer E draw near the delivery ends of the guide-tubes D the trip-bar E¹⁵ is pulled toward the conveyer to such a position that the tripper-fingers E¹⁰ of the conveyer strike against the trip-bar E¹⁵ and the swinging jaw E⁵ is raised. As soon as the match-splints have been pushed into place in the conveyer the trip-bar is pushed back by the cam-rod E¹⁶ and the swinging jaw closes on the splints, holding them fast.

When the conveyer E is stopped opposite the delivery ends of the match-splint guide-tubes D, it is necessary that the heretofore-described orifices formed by the jaws E⁵ and E⁶ of the conveyer coincide exactly with the openings in the guide-tubes D and be at a proper distance therefrom, so that the match-splints may pass freely from the tubes into the conveyer. To effect this, the channeled castings D⁸, Figs. 17, 19, 20, 21, and 22, are mounted on the adjustable supporting-bar D¹⁰ and are so placed that the chain portions of the conveyer E travel through the channelways and are thereby held from any independent forward or backward movement, while the lug D⁹, which projects from the chain-guide $D^8$, Fig. 19, bears against the outside of the rigid arms $E^2$ of the conveyer and prevents any side movement. The supporting-bar $D^{10}$ is adjusted to proper position toward or from the guide-tubes D by means of the hand-wheel $D^{11}$, operating through the worm $D^{12}$, the worm-gear $D^{13}$, and screw $D^{14}$ in nut $D^{21}$. The bar $D^{10}$ is supported by and slides in the grooved bearing $D^{15}$, secured to the machine-frame.

*Spacing-wires and evener-plates, Figs. 17, 22, 23, and 24.*—After the match-splints leave the guide-tubes D and enter the jaws of the conveyer E they are carried downward by the movement of the conveyer through a group of vertical wires D', Figs. 23 and 24. By means of these spacing-wires the splints are kept in the same position relative to each other as when they were in the guide-tubes—that is, evenly spaced in a straight row and parallel to each other—and are thus in the proper position for subsequent operations. These spacing-wires D' are stretched between the bars $D^2$ and $D^3$ and are drawn taut by means of the screw-pins $D^4$ after the manner of the wires in a piano. The diameter of these spacing-wires is equal to the space between the openings in the guide-tubes D.

Extending below the tubes D and in front of and across the full width of the conveyer E are located the evener-plates $D^5$, Figs. 17, 22, 23, and 24, which are hinged at $D^6$, Fig. 24, and are intermittently pressed against the ends of the match-splints as they are carried downward by the conveyer E, and by which evener-plate the match-splints are crowded into the jaws of the conveyer until they all project exactly the same distance from the jaws and are in proper position for the effective application of the igniting mixture.

The evener-plate is actuated by the arm $D^7$, operated by the disk $F^9$, Fig. 17. The spacing-wires D' above described prevent the match-splints from being forced out of proper position laterally by the action of the evener-plates.

*Vertical dip, Figs. 1 and 26.*—After entering the grippers of the conveyer E the match-splints are carried by the continuous movement of the conveyer E between two vertical rows of steam-pipe coils H, located between sprocket-wheels $G^{25}$ and $G^{22}$, Fig. 1, by which steam-pipes the match-splints are heated to such a degree that when their projecting ends are immersed in the melted paraffin (or other like material) in the tank J a sufficient quantity of the paraffin is absorbed by the splints to cause them to burn candle-like when ignited. The coils of steam-pipe are supported by a suitable frame and are incased by a metal chamber H', which is surmounted by the hood $H^2$ and by which hood the heated air is deflected, and thereby prevented from coming in contact with and melting the hardening igniting mixture on the ends of matches which are being carried through the drying-section. From the paraffin-tank the match-splints are carried over the igniting-mixture tank K, the conveyer being supported at this point by the double-tracked conveyer-guiding sling L. This sling has an upward-and-downward movement communicated to it by the connecting-bars L' and $L^2$ and the bell-crank $L^3$ by means of the oscillating disk $F^9$ on the shaft $F^{12}$, which disk, as has been before described, is operated by an eccentric on the main shaft A through the eccentric-rod $F^8$. As the rows of match-splints are successively brought over the roll K', which supplies to the splints the igniting mixture kept in a melted state by the steam-jacketed tank K, the operating connections of the sling L cause it to lower the conveyer E until the ends of the match-splints are immersed to the requisite depth in the mixture on the revolving roll K', operated by the shaft of sprocket $G^{23}$. The upward movement of the sling N raises the splints from the roll, and they continue on their circuit toward and through the drying-section of the machine, where they become completed matches and are ready to be operated upon by the boxing mechanism. This dipping process accomplished by the sling L is necessary to effect the proper application of the igniting mixture and to insure its even globular formation on the end of the match.

*Boxing mechanism, Figs. 27, 28, 29, 30, 31, 32, 33, 34, 35, and 36.*—After the matches have passed through the drying-section of the machine, III, Fig. 1, they are carried by the conveyer E over the sprocket-wheels $G^{15}$ and $F^3$ and around sprocket-wheels F, between which and the idler $F^{13}$ is located the boxing mechanism M, constructed as follows: A supporting-bar M', Figs. 27, 28, 29, and 30, extends diagonally underneath and is secured to the parallel upper chords of the machine-framing. To this bar M' are bolted a series of curved chutes $M^2$, Fig. 30, one chute for each group of gripping devices on the conveyer E and corresponding also in number to the hoppers B on the saw-table below. As the match-box conveyer N travels in a direction at right angles to the line of travel of the match-conveyer E, it is essential that the chutes—eight of which are used in the machine herein described—should be arranged in a diagonal line in order that each chute may feed matches to its own line of match-boxes in regular order, Fig. 27. This diagonal arrangement is necessary also to allow the use of chutes of the same length and radius of curve, thereby permitting all the groups of matches to fall through the chutes in the same space of time and in the same direction, for practice has demonstrated that this method of construction and arrangement is required for the effective and proper operation of the boxing mechanism.

The chutes $M^2$ lead into the receiving-trays $M^3$, Fig. 30, which are also supported by the diagonal bar M', there being one tray underneath each chute.

In each tray $M^3$ are two hinged flaps $M^4$ and $M^5$, which when closed form a shelf upon which the matches lie when dropped from the jaws of the conveyer E through the chutes, Fig. 30. The flaps $M^4$ and $M^5$ are opened and closed by means of the racks $M^6$, operating on the pinions $M^7$, Figs. 27, 29, 30, and 33, which latter turn the flap-operating rods $M^8$ and $M^9$. Projecting flanges or ears $M^{18}$ and $M^{19}$ on the flaps form trimmers for lining up the matches as they fall, Fig. 33. The racks $M^6$ are connected to the rack-bars $M^{10}$, which slide in the bearings $M^{11}$ and are oscillated by the cams $M^{12}$ on shaft $M^{20}$, Fig. 27, which are operated by connections to the main shaft, comprising miter-gears $M^{22}$, shaft $M^{21}$, and the miter-gears $M^{23}$. (See Fig. 1 for the latter.)

Secured to the top of the diagonal bar $M'$ is a row of tripping-rails $M^{13}$, Figs. 27, 28, and 30, located in the paths of travel of the trip-fingers $E^{10}$ of the conveyer E and also placed and notched so as to conform to the diagonal line of the chutes $M^2$, Fig. 30.

Below the tripping-rails $M^{13}$ are suspended the inclined runways $M^{14}$, extending underneath the full width of the conveyer E.

The operation of the boxing mechanism above described is as follows: As each group of the grippers of the conveyer E reach a point over the forward end of the tripping-rails $M^{13}$, the trip-fingers $E^{10}$ of the swinging jaw $E^5$, Fig. 30, are engaged by the notched elevations $a$ on the tripping-rails, whereby the jaws of the grippers are partly opened and the row of matches held therein drop to and rest endwise on the surface of the inclined runway $M^{14}$, but not entirely out of the jaws. To insure the dropping of every match in the group, the notches of the elevations $a$ of the tripping-rail cause a vibration of the grippers while the fingers $E^{10}$ are being dragged along by the movement of the conveyer and the ends of the matches are slipping on the runway. When the notched elevation $a$ is passed by the grippers, the jaws again close on the matches and line them up, if any have been jarred out of proper position. This process is repeated at the notched elevation $b$, at which point the matches are dropped to a lower level on the runway. When the last tripping of the fingers $E^{10}$ occurs at the notched elevation $c$, just over the chutes $M^2$, the matches drop freely and simultaneously from the jaws of the conveyer E and sliding down the chutes lie side by side in a straight and even row on the closed flaps $M^4$ and $M^5$. Since the surfaces of the match-splints are more or less roughened by the action of the dividers, some are apt to stick in the grippers as usually constructed, even when the jaws are opened wide. By the construction above described the matches are so loosened from the grip of the jaws that they all drop out at the proper point and fall into the chutes simultaneously. The conveyer E is held from any sidewise or vertical movement while passing over the boxing mechanism by the channeled guide-bar $D^{16}$. The cam $M^{12}$ and its connections are so arranged that the moment the matches slide upon the flaps $M^4$ and $M^5$ the latter instantly swing downward and deposit the matches into the match-box underneath in the same order in which they lay upon the flaps when closed. This movement of the flaps and dropping of the matches is diagrammatically illustrated in Figs. 32, 33, 34, and 35. The ears $M^{18}$ and $M^{19}$, projecting from the flaps, keep the matches lined up endwise as they fall into the boxes.

Fig. 36 shows another construction of the tray $M^{13}$, in which the flaps $M^{15}$ extend from side to side of the tray instead of from end to end, as shown in Fig. 30. The number of flaps is necessarily increased, and they are operated by the levers $M^{16}$ by means of the bar $M^{17}$, controlled by a cam, as in the first-described method, which is preferred.

The tripping-rails $M^{13}$ extend beyond the boxing-section of the machine to the brushes $E^{18}$, Figs. 29 and 27, which are driven by a pulley on the shaft of sprocket $G^{15}$, Fig. 1. These revolving brushes sweep out of the still open jaws of the conveyer E any matches which may have failed to drop out into the chutes.

*Match-box conveyer, Figs. 28, 29, 30, and 31.*—The secondary or match-box conveyer N, which travels in a line at right angles to the main conveyer E and passes underneath the latter at the boxing-section of the machine, is formed of two lines of endless machine-chain $N'$, which are connected by the rods $N^2$, Figs. 29, 30, and 31, one rod to each pair of opposite chain-links, and on these rods are fastened oblong metal plates $N^3$, Figs. 30 and 31, so arranged as to afford a carrying-support for the rows of match-boxes placed thereon.

A vertical projection $N^8$ on each of the plates $N^3$ forms a spacer for the boxes, and lines of wire $N^4$, stretched longitudinally above the conveyer, prevent lateral movement of the boxes. To hold the match-boxes more securely from any side movement when passing under the boxing mechanism and also to form a continuation of the tray-flaps when opened, thin strips of metal $N^5$ are secured to the wires vertically and extend from a point underneath the right-hand chute to the farthest point of travel of the boxes on the left of the machine. The guide-plates $N^5$ are held in an upright position and properly spaced by connections secured to the machine-frame. The conveyer is carried by two pairs of sprocket-wheels $N^6$ $N^7$, Fig. 28, the former pair of which is intermittently revolved by means of the twin ratchet-wheels $N^9$, whose double-pointed pawl $N^{10}$ is operated by the pawl-arm $N^{11}$, keyed onto the rocking shaft $N^{12}$. The rocking shaft $N^{12}$ is actuated by an eccentric on the main shaft A by means of the shaft-arm $N^{13}$ and the connecting-rod $N^{14}$. The pair of sprocket-wheels $N^7$ is turned by the movement of the sprocket-chain N'. The duration of time while the conveyer N is at rest and certain of the match-boxes are receiving matches from the chutes is regulated by the arrangement and spacing of the teeth of the twin ratchet-wheels, whereby a greater or a smaller number of matches may be deposited in the boxes, as may be predetermined and thus provided for. To insure the stopping of the intermittently-moved conveyer N so that rows of match-boxes may be successively at a state of rest in the precise location with reference to the chutes, as is required for the perfect operation of the match-depositing mechanism, the stop-bars $N^{15}$ $N^{16}$ are oscillated in and out of the path of the teeth of the sprocket-wheels in such a manner that a pair of teeth of sprocket-wheel $N^6$ is successively engaged by stop-bar $N^{15}$, while at the same time a corresponding pair of teeth of sprocket-wheel $N^7$ is engaged by stop-bar $N^{16}$ at the moment when the pawl $N^{10}$ ceases its forward driving movement, and thus the sprocket-wheels are prevented from "racing" or revolving by momentum beyond the proper point. The oscillating movement of the stop-bars is effected by means of the rocking arm $N^{17}$, which is keyed onto the same shaft $N^{12}$ which operates the pawl-arm $N^{11}$. The rocking arm $N^{17}$ is connected to the stop-bar $N^{15}$ by the link $N^{18}$, and by the connecting-rod $N^{19}$ to the lever $N^{20}$, which latter actuates the stop-bar $N^{16}$. The oscillating guide-arm $N^{21}$ supports the stop-bar $N^{15}$ and guides it into position.

To adjust the level of the box-conveyer N, permitting the use of match-boxes of different depths, the channeled box-conveyer guideways $D^{17}$, Figs. 29, 30, and 31, are elevated or depressed by means of the screws $D^{18}$, driven by miter-gears $D^{19}$, which are operated by the cranks $D^{20}$.

Secured to the table, underneath the saws, is the dust-collecting hood $C^{13}$, Figs. 1 and 2, with the pipe $C^{14}$, leading into the exhauster $C^{15}$. From the exhauster the dust may be carried by piping to any convenient place of deposit and intermediately through a dust-separator, if necessary. An opening in the front of the hood $C^{13}$, covered by a movable slide, permits the admission of the grinding-wheel to the saws.

Having described my invention, what I claim, and desire to secure by Letters Patent, is as follows:

1. In a match-making machine the spring-controlled platen-tongues $B^9$ with their lugs $B^{10}$, slots $B^{11}$, and knobs $B^{15}$, the controlling-springs $B^{12}$, which, when released, allow a movement of the platen-tongue independent of the platen $B^8$, the connecting-bolt $B^{13}$ and the spring-tension adjuster $B^{14}$; in combination with the platen $B^8$, hopper B, side bars $A^2$, eccentrics A', and driving-shaft A; substantially as shown and described.

2. In a match-making machine, in combination with a match-blank-receiving hopper having a movable bottom or platen; a match-blank-driving platen-tongue $B^9$, normally attached to and operated by the platen by means of the spring $B^{12}$, and the spring $B^{12}$ permanently secured to the platen and adjusted to press against and move the platen-tongue until released by abnormal resistance to the movement of the platen-tongue, substantially as shown and described.

3. In a match-making machine, in combination with the main driving-shaft A, eccentrics A', side bars $A^2$, platen $B^8$, and hopper B, the independently - movable spring - controlled platen-tongues $B^9$, substantially as and for the purpose shown and described.

4. In a machine for making matches, the match-blank-lifting studs $B^{17}$, connecting-bar $B^{20}$, separate controlling - handles $B^{18}$ with their slots $B^{23}$, the bearing and operating shaft $B^{21}$ with its key $B^{22}$, and the general operating-handle $B^{19}$; in combination with the hopper B, platen $B^8$, side bars $A^2$, eccentrics A' and driving-shaft A, substantially as shown and described.

5. In a match-making machine, in combination with the hoppers B, platen $B^8$ and platen-tongue $B^9$; the lifting-studs $B^{17}$ with their separately-operating and their simultaneously-operating mechanism, substantially as and for the purpose shown and described.

6. In a match-making machine, the individual, self-adjusting gripper-springs $E^9$; in combination with the conveyer E as constructed with two lines of sprocket-chain, connecting-rods E' supporting the swinging jaw $E^5$, connecting-rods $E^3$ and $E^4$ supporting the rigid jaw $E^6$, the separators $E^8$ and the jaw-closing spring $E^7$, substantially as and for the purpose shown and described.

7. In a match-making machine; the combination in a match-conveyer, of three rods connecting each opposite link of two lines of conveyer-chains, a gripper-jaw rigidly and immovably secured to two of these connecting-rods, a second gripper-jaw swinging free on the third connecting-rod, operated in conjunction with said rigid jaw to grip matches or match-splints and having independent self-adjusting gripping-springs which operate against the resistance of individual match-supporting bars or plates forming a part of the rigid jaw, and a jaw-closing spring, substantially as shown and described.

8. In a match-making machine the intermittently-operated trip-bar $E^{15}$, cam-fork $E^{16}$, guide-arm $E^{17}$ and operating-cam secured to the driving-shaft A; in combination with the conveyer E as constructed with two lines of sprocket-chain, connecting rods and arms, swinging jaw $E^5$, rigid jaw $E^6$, trip-fingers $E^{10}$ and jaw-closing spring $E^7$, substantially as shown and described.

9. In a match-making machine in combination with a match-conveyer constructed with opening and closing, match-gripping jaws, one swinging, the other rigid, the swinging jaw provided with projecting trip-fingers; the trip-bar $E^{15}$, pivoted to the machine-frame by the arm $E^{17}$ and intermittently swung in and out of the path of travel of the trip-fingers by means of connections to the driving-shaft A, substantially as and for the purpose shown and described.

10. In a match-making machine, the combination of the conveyer E as constructed, the driving-sprocket $F^7$, pawl $F^{10}$, ratchet $F^{11}$, eccentric-rod $F^8$, stop-bar-bracing rod $E^{14}$, and stop-bar $E^{11}$, operated by the cam $E^{12}$, on shaft A, to intermittently engage the teeth of the sprockets $F^7$ and thereby stop their further movement, substantially as and for the purpose shown and described.

11. In a match-making machine in combination with a match-conveyer constructed in part of two lines of sprocket-chain connected by rods bearing groups of match-gripping jaws, and a pair of conveyer-carrying sprocket-wheels located on opposite ends of the same shaft; a stop-bar operated to simultaneously engage the opposite teeth of the two sprocket-wheels, an arm pivoted to the machine-frame and holding the stop-bar against the thrust of the teeth of the sprocket-wheels, and connections to the main shaft which intermittently operate the stop-bar, substantially as shown and described.

12. In a match-making machine, the vertical match-splint-spacing wires D', their supporting-bars $D^2$ and $D^3$ and tightening-pins $D^4$; in combination with the splint-guide tubes D and the conveyer E, substantially as shown and described.

13. In a match-making machine, the evener-plate $D^5$ constructed in one piece to operate on a line of matches in a match-conveyer, one end hinged to an immovable part of the machine-frame, the opposite end free to oscillate, the hinge $D^6$ and operating-arm $D^7$ connected to the main shaft; in combination with the conveyer E constructed in part of two lines of sprocket-chain connected by rods bearing groups of gripping-jaws substantially as and for the purpose shown and described.

14. In a match-making machine, the swinging, evener-plate $D^5$, constructed in one piece and having one end secured to an immovable part of the machine-frame by the hinge $D^6$, and the opposite end free to oscillate in a forward-and-backward movement to and from the spacing-wires D', the hinge $D^6$, and operating connections to the main shaft, in combination with the spacing-wires D', and the conveyer E, substantially as shown and described.

15. In a match-making machine having a match-conveyer consisting in part of an endless chain or chains or belts; the trimming-plate $D^5$ with its conjointly-operating mechanism, comprising the hinge $D^6$, connecting-arm $D^7$ and disk $F^9$ actuated by an eccentric on the shaft A through the connecting-rod $F^8$, substantially as shown and described.

16. In a match-making machine, the adjustable, vertical conveyer guide and steadying device, comprising the channeled guide-ways $D^8$ with their guide-lugs $D^9$, the adjustable supporting-bar $D^{10}$ and its operating-screws $D^{14}$, worms $D^{12}$, gears $D^{13}$ and hand-wheel $D^{11}$, in combination with the supporting-table I, conveyer E and its driving sprocket-wheels, substantially as shown and described.

17. In a match-making machine, the mechanism for effecting a varying movement of the match-conveyer comprising the main shaft A, eccentrics on said shaft, eccentric-rods $F^8$, disks $F^9$, pawls $F^{10}$, ratchets $F^{11}$ and sprocket-wheels $F^7$, together with eccentric-rods $F^5$, disks $F^6$, connecting-bars $F^4$, pawls F', ratchets $F^2$ and sprocket-wheels F for driving the conveyer in an intermittent movement of equal and regular pulsations; spur-gears G' and $G^2$, driven also by the main shaft A, vertical shafts $G^7$ and $G^8$, miter-gears $G^4$, $G^5$ and $G^6$, bevel-gears and pinions $G^{13}$, worm-gears and worms $G^{14}$, shafts $G^9$, $G^{10}$, $G^{11}$, and $G^{12}$, and the series of driving sprocket-wheels $G^{15}$, $G^{16}$, $G^{17}$, $G^{18}$, $G^{19}$, $G^{20}$, $G^{21}$, $G^{22}$, $G^{23}$, and $G^{24}$, for effecting a constant, regular and uniform movement of the conveyer; in combination with the conveyer E as constructed with the swinging jaw $E^5$, the rigid jaw $E^6$, the individual gripping-springs $E^9$ and the separators $E^8$ as and for the purpose shown and described.

18. In a match-making machine, mechanism for effecting in conjunction a regularly intermittent movement and a uniformly constant movement of a match-conveyer, comprising a main driving-shaft actuating a double set of sprocket-wheels F and $F^7$ by means of pawls and ratchets connected thereto, whereby an intermittent movement of equal and regular pulsations is effected through certain portions of the circuit of the conveyer, together with a series of individually and simultaneously operated driving sprocket-wheels also actuated by the main shaft through a corresponding series of worms and gears, whereby a constant, regular and uniform movement of the conveyer is effected through other portions of the circuit of the conveyer; in combination with a match-conveyer constructed in part of two lines of endless machine or sprocket chain, the opposite links of which are connected by rods which support and carry match-gripping jaws, one fixed the other swinging, the swinging jaw having separate, individual match-gripping springs, the two jaws kept normally closed by a heavier spring attached to one jaw and bearing against the other; substantially as shown and described.

19. In a match-making machine, the main shaft A, sprocket-wheels F and $F^7$, driven in a regularly intermittent movement by eccentrics on the main shaft through pawls and ratchets, the conveyer E constructed with the rods E', $E^3$ and $E^4$, swinging jaw $E^5$, rigid jaw $E^6$, jaw-closing spring $E^7$, separators $E^8$ and individual match-gripping springs $E^9$, in combination with a series of individually and simultaneously operated driving sprocket-wheels actuated by the main shaft through a corresponding series of worms and gears, whereby a constant, regular and uniform movement is imparted to the conveyer E through the match-splint-dipping and match-drying sections of the machine, substantially as and for the purpose shown and described.

20. In a match-making machine, the double-tracked, conveyer-supporting sling L, moved vertically to and from the mixture-applying roll by reciprocating connections to the driving-shaft whereby the match-conveyer, while it is traveling in a constant forward movement, is brought in proximity to the mixture-applying roll, in combination with the match-conveyer as constructed and a constantly-revolving, mixture-applying roll substantially as shown and described.

21. In a match making and boxing machine, in combination with a match-carrier; a boxing mechanism comprising the diagonal supporting-bar $M'$, dependent chutes $M^2$, depositing-tray $M^3$ with its flaps $M^4$ and $M^5$ and flap-ears $M^{18}$ and $M^{19}$, the flap-operating rods $M^8$ and $M^9$ and the operating mechanism comprising the racks $M^6$, pinions $M^7$, rack-bars $M^{10}$, cams $M^{12}$, shafts $M^{20}$ and $M^{21}$ and bevel-gears $M^{22}$ and $M^{23}$, substantially as shown and described.

22. In a match making and boxing machine, in combination with a match-carrier; the match-depositing tray $M^3$ having the swinging flaps $M^4$ and $M^5$ with their trimming-ears $M^{18}$ and $M^{19}$, the pinions, racks, shafts, cams and gears operating the same, substantially as shown and described.

23. In a match making and boxing machine, in combination with the match-conveyer E and match-box conveyer N; a match-boxing mechanism comprising the guiding-chutes $M^2$ and the receiving-trays $M^3$, which latter have the match-depositing, downward-swinging flaps or shutters operated conjointly with the movement of the conveyer E by connections to the main driving-shaft A, substantially as shown and described.

24. In a match making and boxing machine, in combination with a match-conveyer having gripping-jaws $E^5$ and $E^6$ with trip-fingers $E^{10}$; the jaw-opening trip-rails $M^{13}$ which have alternate raised and depressed surfaces, the former preferably notched, the inclined runway $M^{14}$, and the chutes $M^2$, substantially as shown and described.

25. In a match making and boxing machine, in combination with a match-conveyer having opening and closing jaws, or match-grippers, with trip fingers or lugs $E^{10}$; the jaw-opening trip-rails $M^{13}$ which have alternate raised and depressed surfaces, the former preferably notched, the inclined runway $M^{14}$, the diagonal bar $M'$, chutes $M^2$, trays $M^3$, flaps $M^4$ and $M^5$, trimming-ears $M^{18}$ and $M^{19}$, flap-operating rods $M^8$ and $M^9$ and the pinions, racks, shafts and gears and connections for operating the flaps, substantially as shown and described.

26. In a machine for making and boxing matches, in combination with the match-conveyer E and the match-box conveyer N; the chutes $M^2$ and the adjustable guideways $D^{17}$ with their adjusting-screws $D^{18}$, gears $D^{19}$ and operating-cranks $D^{20}$, as and for the purpose shown and described.

27. In a match-making machine, in combination with a match-box conveyer constructed in part of two lines of sprocket-chain connected by rods which bear match-box supporting and spacing plates; the channeled box-conveyer guides $D^{17}$, with the adjusting-screws, gears and operating-cranks; substantially as shown and described.

28. In a match making and boxing machine, in combination with the box-conveyer adjuster $D^{17}$ and its operating mechanism; the conveyer N constructed of two lines of machine-chain $N'$, connecting-rods $N^2$, match-box supports and spacers $N^3$ and $N^8$, guide-wires $N^4$ and their attached guide-strips $N^5$, substantially as shown and described.

29. In a machine for making matches, the intermittently-operated stop-bars $N^{15}$ and $N^{16}$, their connecting-rod $N^{19}$, lever $N^{20}$, guide-arm $N^{21}$ and link $N^{18}$, the rocking arm $N^{17}$ and rocking shaft $N^{12}$; in combination with the conveyer, sprocket-wheels $N^6$ and $N^7$, pawls $N^{10}$, ratchets $N^9$, rocking arm $N^{13}$, eccentric-rod $N^{14}$ and an operating eccentric on the main shaft A, substantially as and for the purpose shown and described.

30. In a match-making machine, the conveyer-cleaning, revolving brushes $E^{18}$; in combination with the conveyer E having the match-gripping jaws provided with trip-fingers $E^{10}$, the trip-rails $M^{13}$ operating on the trip-fingers to hold open the gripping-jaws during the cleaning action of the brushes, and the driving-shaft A operating the brushes through gearing, substantially as shown and described.

CHARLES CARR.

Witnesses:
  CHARLES L. ELLIS,
  JAMES W. RIPLEY.